US010381715B2

(12) United States Patent
Han et al.

(10) Patent No.: US 10,381,715 B2
(45) Date of Patent: Aug. 13, 2019

(54) ELECTRONIC DEVICE ANTENNAS HAVING MULTI-BAND TUNING CAPABILITIES

(71) Applicant: Apple Inc., Cupertino, CA (US)

(72) Inventors: Liang Han, Sunnyvale, CA (US); Thomas E. Biedka, San Jose, CA (US); Matthew A. Mow, Los Altos, CA (US); Iyappan Ramachandran, Santa Clara, CA (US); Mattia Pascolini, San Francisco, CA (US); Xu Han, San Jose, CA (US); Hao Xu, Cupertino, CA (US); Jennifer M. Edwards, San Francisco, CA (US); Salih Yarga, Sunnyvale, CA (US); Yijun Zhou, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 15/602,972

(22) Filed: May 23, 2017

(65) Prior Publication Data

US 2018/0342794 A1 Nov. 29, 2018

(51) Int. Cl.
*H01Q 1/24* (2006.01)
*H04W 4/02* (2018.01)
(Continued)

(52) U.S. Cl.
CPC .............. *H01Q 1/245* (2013.01); *H01Q 1/243* (2013.01); *H01Q 5/328* (2015.01); *H01Q 9/42* (2013.01);
(Continued)

(58) Field of Classification Search
CPC .......... H01Q 1/38; H01Q 9/045; H01Q 5/371; H01Q 1/243; H01Q 1/521
(Continued)

(56) References Cited

U.S. PATENT DOCUMENTS 7,564,411 B2 7/2009 Piisila et al.
8,106,834 B2 1/2012 Copeland
(Continued)

FOREIGN PATENT DOCUMENTS

WO 2010083284 7/2010

OTHER PUBLICATIONS

Christodoulou et al., Reconfigurable Antennas for Wireless and Space Applications, Proceedings of the IEEE, Jul. 2012, vol. 100, pp. 2250-2261.
(Continued)

*Primary Examiner* — Huedung X Mancuso
(74) *Attorney, Agent, or Firm* — Treyz Law Group, P.C.; Michael H. Lyons

(57) ABSTRACT

An electronic device may include an antenna having a resonating element, an antenna ground, and a feed. First and second tunable components may be coupled to the resonating element. Adjustable matching circuitry may be coupled to the feed. Control circuitry may use the first tunable component to tune a midband antenna resonance when sensor circuitry identifies that the device is being held in a right hand and may use the second tunable component to tune the midband resonance when the sensor circuitry identifies that the device is being held in a left hand. For tuning a low band resonance, the control circuitry may place the antenna in different tuning states by sequentially adjusting a selected one of the matching circuitry and the tunable components, potentially reverting to a previous tuning state at each step in the sequence. This may ensure that antenna efficiency is satisfactory regardless of antenna loading conditions.

20 Claims, 12 Drawing Sheets

(51) Int. Cl.
*H04B 1/401* (2015.01)
*H01Q 9/42* (2006.01)
*H01Q 5/328* (2015.01)
*H04B 1/04* (2006.01)
*H04B 1/18* (2006.01)
*H01Q 5/35* (2015.01)
*H04W 88/06* (2009.01)

(52) U.S. Cl.
CPC ............. *H04B 1/0458* (2013.01); *H04B 1/18* (2013.01); *H04B 1/401* (2013.01); *H04W 4/026* (2013.01); *H01Q 5/35* (2015.01); *H04W 88/06* (2013.01)

(58) Field of Classification Search
USPC .................................................. 343/700 MS
See application file for complete search history.

(56) References Cited

U.S. PATENT DOCUMENTS

| | | |
|---|---|---|
| 8,204,446 B2 | 6/2012 | Scheer et al. |
| 8,890,752 B2 | 11/2014 | Song et al. |
| 9,002,262 B1 | 4/2015 | Kuo |
| 9,203,138 B2 | 12/2015 | Bavisi et al. |
| 9,240,830 B2 | 1/2016 | Ljung et al. |
| 9,331,397 B2 | 5/2016 | Jin et al. |
| 9,392,558 B2 | 7/2016 | See et al. |
| 9,466,872 B2 | 10/2016 | Sanchez et al. |
| 9,537,223 B2 | 1/2017 | Hall et al. |
| 9,553,361 B2 | 1/2017 | Hu et al. |
| 9,557,868 B2 | 1/2017 | Ayala Vazquez et al. |
| 2007/0001906 A1 | 1/2007 | Pelzer et al. |
| 2013/0005278 A1 | 1/2013 | Black et al. |
| 2013/0169490 A1 | 7/2013 | Pascolini et al. |
| 2015/0270613 A1 | 9/2015 | Toh et al. |
| 2015/0340769 A1 | 11/2015 | Desclos et al. |
| 2016/0172768 A1 | 6/2016 | Lahti et al. |
| 2016/0226132 A1 | 8/2016 | Kim et al. |
| 2016/0322699 A1 | 11/2016 | Mow et al. |
| 2017/0033460 A1 | 2/2017 | Ayala Vazquez et al. |
| 2017/0040668 A1 | 2/2017 | Ayala Vazquez et al. |
| 2017/0084989 A1 | 3/2017 | Shi et al. |

OTHER PUBLICATIONS

Rowell et al., Multiple Frequency Band and High Isolation Mobile Device Antennas Using a Capacitive Slot, IEEE Transactions on Antennas and Propagation, Aug. 2012, vol. 60, pp. 3576-3582.
Ayala Vazquez et al., U.S. Appl. No. 14/811,714, filed Jul. 28, 2015.
Hagedon et al., "Bright e-Paper by transport of ink through a white electrofluidic imaging film", Nature Communications, vol. 3, Article No. 1173, 7 pp., DOI:10.1038/ncomms2175, Nov. 6, 2012, URL: www.nature.com/naturecommunications.
Keilenfeld et al., "Electrofluidic displays using Young—Laplace transposition of brilliant pigment dispersions", Naturz Phonics, vol. 3, pp. 292-296, DOI: 10.1038/NPHOTON.2009.68, Apr. 26, 2009, URL: www.nature.com/naturephotonics.
Han et al., U.S. Appl. No. 15/255,770, filed Sep. 2, 2016.
Han et al., U.S. Appl. No. 14/980,603, filed Dec. 28, 2015.
Ding et al., "A novel dual-band printed diversity antenna for mobile terminals", IEEE Transactions on Antennas and Propagation 55.7 (2007): 2088-2096. (http://pure.qub.ac.uk/portal/files/18190630/A_Novel_Dual_band_Printed_Diversity_Antenna_for_Mobile_Terminals.pdf>.
Wang et al., "Researches on reconfigurable antenna in CEMLAB at UESTC", Journal of Electronic Science and Technology of China vol. 4 (2006): 226. <http://data.eefocus.com/myspace/0/983/bbs/1176546832/4dafd74a.pdf>.
Han et al., U.S. Appl. No. 15/429,597, filed Feb. 10, 2017.

ELECTRONIC DEVICE ANTENNAS HAVING MULTI-BAND TUNING CAPABILITIES

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to form electronic device antenna structures with desired attributes. In some wireless devices, antennas are bulky. In other devices, antennas are compact, but are sensitive to the position of the antennas relative to external objects. If care is not taken, antennas may become detuned, may emit wireless signals with a power that is more or less than desired, or may otherwise not perform as expected.

It would therefore be desirable to be able to provide improved wireless circuitry for electronic devices.

SUMMARY

An electronic device may have wireless circuitry with a radio-frequency transceiver and antennas. An antenna may include an antenna resonating element arm, an antenna ground, and an antenna feed. The antenna resonating element arm and antenna ground may be formed from metal housing structures or other conductive structures that are separated by a slot. First and second tunable components may be coupled between the antenna ground and the antenna resonating element arm across the slot and on opposing sides of the feed. An adjustable impedance matching circuit may be coupled between the radio-frequency transceiver and the antenna feed. The electronic device may include sensor circuitry such as an orientation sensor and an impedance sensor that generate sensor data. The antenna may exhibit resonances in a low band, midband, high band, ultra-high band, and/or other frequency bands.

The control circuitry may place the antenna in a first non-free space mode of antenna operation in which the first tunable component tunes the midband resonance and in a second non-free space mode of antenna operation in which the second tunable component tunes the midband resonance. The control circuitry may place the antenna in the first non-free space mode when the orientation sensor detects that the device is being held in a user's right hand and may place the antenna in the second non-free space mode when the orientation sensor detects that the device is being held in the user's left hand, for example.

When tuning the low band resonance of the antenna, the control circuitry may place the antenna in a selected tuning state of a set of different tuning states. For example, the control circuitry may place the antenna in a first tuning state by adjusting the adjustable impedance matching circuit, may adjust the antenna from the first tuning state to a second tuning state by adjusting the tunable components, and may gather sensor data using the sensor circuitry while the antenna is placed in each of the first and second tuning states. The control circuitry may adjust the antenna from the second tuning state back to the first tuning state by reverting the setting of the tunable components prior to adjusting the antenna to any other tuning state in the set of tuning states. Alternatively, the control circuitry may adjust the antenna from the second tuning state to a third tuning state by further adjusting the impedance matching circuit. The control circuitry may determine which adjustment to make based on the sensor data. This process may be repeated across each of the different tuning states by sequentially adjusting only one of the matching circuitry and the tunable components at a given time, potentially reverting to a previous tuning state at each step in the sequence, until an optimal setting is identified by the sensor data. This may ensure that antenna efficiency is satisfactory regardless of the frequency of operation and regardless of the environmental loading conditions of the antenna.

DETAILED DESCRIPTION

Figure 1:
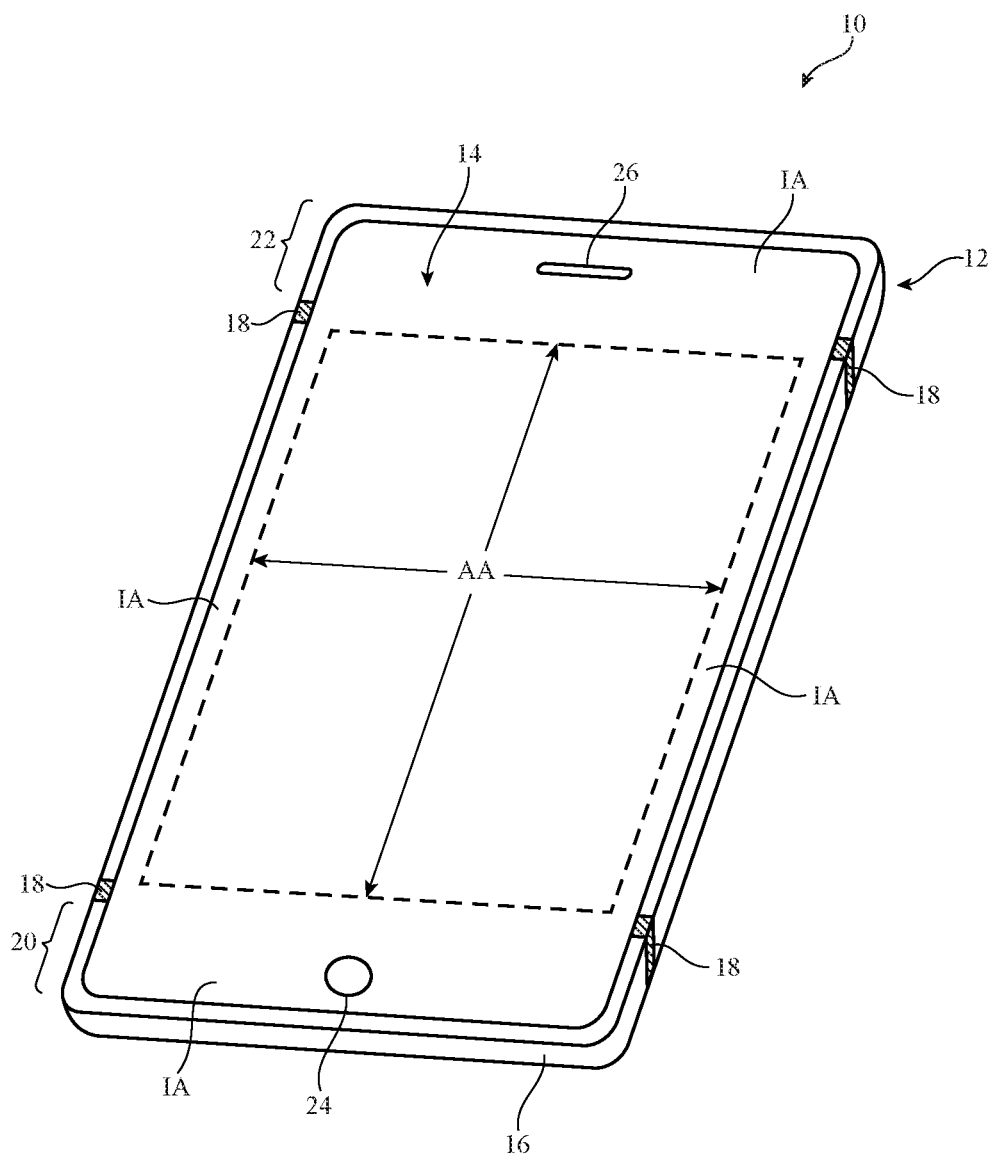
FIG. 1 is a perspective view of an illustrative electronic device in accordance with an embodiment.

Electronic devices such as electronic device 10 of FIG. 1 may be provided with wireless communications circuitry. The wireless communications circuitry may be used to support wireless communications in multiple wireless communications bands.

The wireless communications circuitry may include one more antennas. The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures.

The conductive electronic device structures may include conductive housing structures. The housing structures may include peripheral structures such as peripheral conductive structures that run around the periphery of an electronic device. The peripheral conductive structure may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures.

Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a planar housing wall. The rear housing wall may have slots that pass entirely through the rear housing wall and that therefore separate housing wall portions (and/or sidewall portions) of housing 12 from each other. Housing 12 (e.g., the rear housing wall, sidewalls, etc.) may also have shallow grooves that do not pass entirely through housing 12. The slots and grooves may be filled with plastic or other dielectric. If desired, portions of housing 12 that have been separated from each other (e.g., by a through slot) may be joined by internal conductive structures (e.g., sheet metal or other metal members that bridge the slot).

Display 14 may include pixels formed from light-emitting diodes (LEDs), organic LEDs (OLEDs), plasma cells, electrowetting pixels, electrophoretic pixels, liquid crystal display (LCD) components, or other suitable pixel structures. A display cover layer such as a layer of clear glass or plastic may cover the surface of display 14 or the outermost layer of display 14 may be formed from a color filter layer, thin-film transistor layer, or other display layer. Buttons such as button 24 may pass through openings in the cover layer. The cover layer may also have other openings such as an opening for speaker port 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as flat or curved vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Display 14 may have an array of pixels that form an active area AA that displays images for a user of device 10. An inactive border region such as inactive area IA may run along one or more of the peripheral edges of active area AA.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a midplate) that spans the walls of housing 12 (i.e., a substantially rectangular sheet formed from one or more parts that is welded or otherwise connected between opposing sides of member 16). Device 10 may also include conductive structures such as printed circuit boards, components mounted on printed circuit boards, and other internal conductive structures. These conductive structures, which may be used in forming a ground plane in device 10, may be located in the center of housing 12 and may extend under active area AA of display 14.

In regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air, plastic, and other dielectrics and may be used in forming slot antenna resonating elements for one or more antennas in device 10.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22), thereby narrowing the slots in regions 20 and 22. In configurations for device 10 with narrow U-shaped openings or other openings that run along the edges of device 10, the ground plane of device 10 can be enlarged to accommodate additional electrical components (integrated circuits, sensors, etc.)

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with peripheral gap structures. For example, peripheral conductive housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two of gaps 18), three peripheral conductive segments (e.g., in an arrangement with three of gaps 18), four peripheral conductive segments (e.g., in an arrangement with four gaps 18, etc.). The segments of peripheral conductive housing structures 16 that are formed in this way may form parts of antennas in device 10.

If desired, openings in housing 12 such as grooves that extend partway or completely through housing 12 may extend across the width of the rear wall of housing 12 and may penetrate through the rear wall of housing 12 to divide the rear wall into different portions. These grooves may also extend into peripheral housing structures 16 and may form antenna slots, gaps 18, and other structures in device 10. Polymer or other dielectric may fill these grooves and other housing openings. In some situations, housing openings that form antenna slots and other structure may be filled with a dielectric such as air.

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
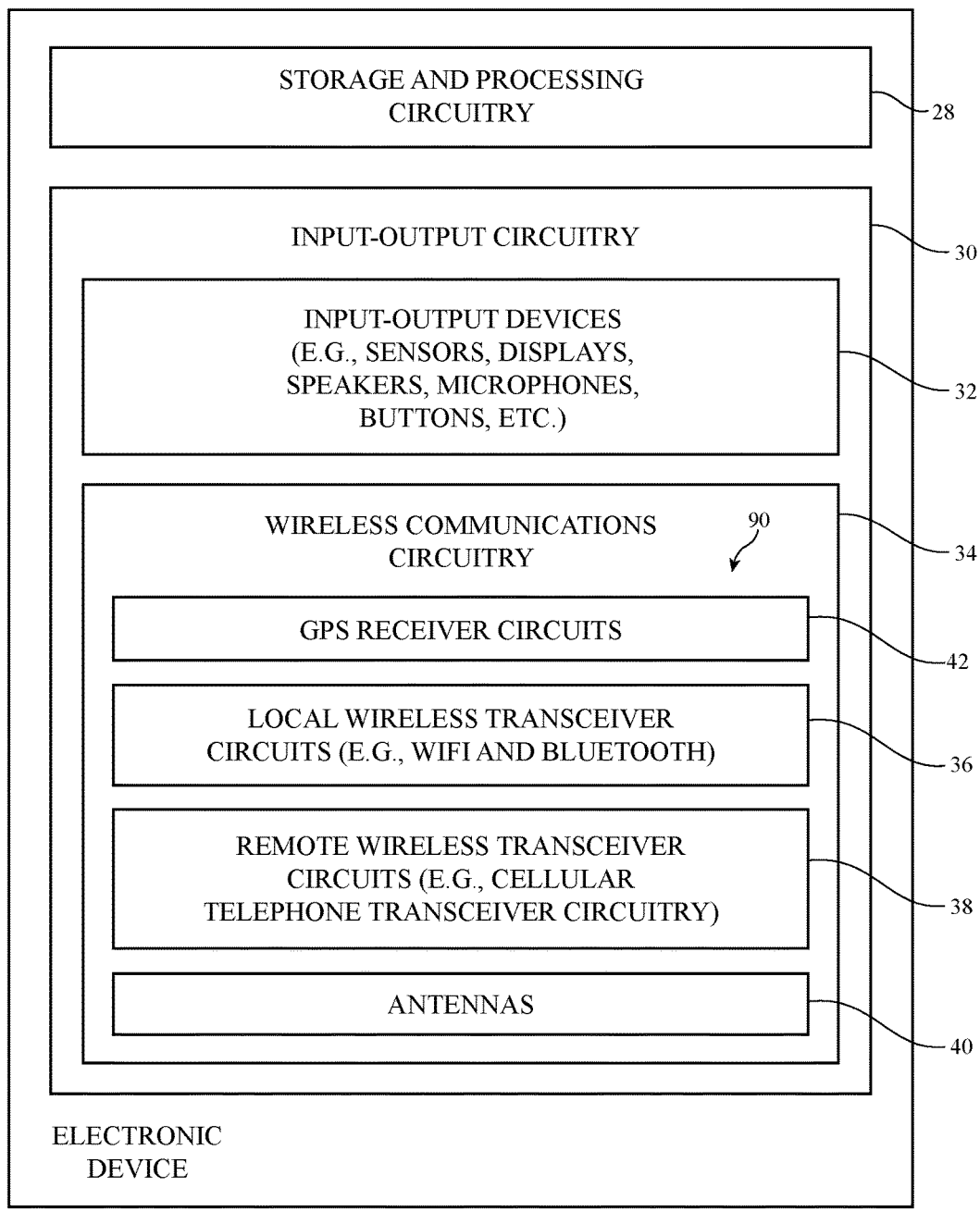
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, multiple-input and multiple-output (MIMO) protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, position and orientation sensors (e.g., sensors such as accelerometers, gyroscopes, and compasses), capacitance sensors, proximity sensors (e.g., capacitive proximity sensors, light-based proximity sensors, etc.), fingerprint sensors (e.g., a fingerprint sensor integrated with a button such as button 24 of FIG. 1 or a fingerprint sensor that takes the place of button 24), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a low-midband from 960 to 1710 MHz, a midband from 1710 to 2170 MHz, a high band from 2300 to 2700 MHz, an ultra-high band from 3400 to 3700 or other communications bands between 700 MHz and 3700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
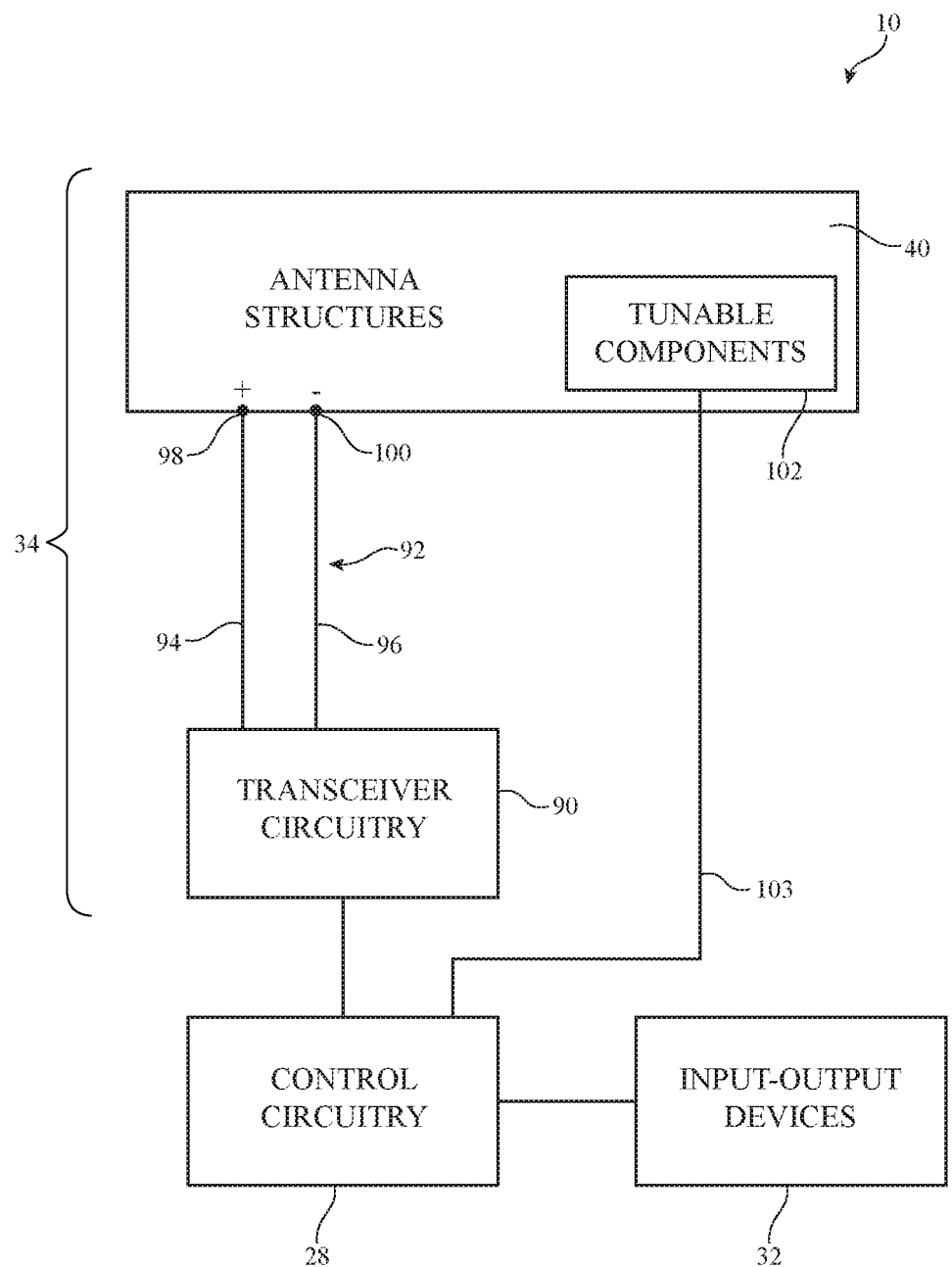
FIG. 3 is a schematic diagram of illustrative wireless circuitry in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits such as tunable components 102 to tune antennas over communications bands of interest. Tunable components 102 may be part of a tunable filter or tunable impedance matching network, may be part of an antenna resonating element, may span a gap between an antenna resonating element and antenna ground, etc. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 103 that adjust inductance values, capacitance values, or other parameters associated with tunable components 102, thereby tuning antenna structures 40 to cover desired communications bands.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable, a stripline transmission line, or a microstrip transmission line (as examples). A matching network (e.g., an adjustable matching network formed using tunable components 102) may include components such as inductors, resistors, and capacitors used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. For example, antenna structures 40 may be fed using multiple feeds. The illustrative feeding configuration of FIG. 3 is merely illustrative.

Control circuitry 28 may use an impedance measurement circuit to gather antenna impedance information. Control circuitry 28 may use information from a proximity sensor (see, e.g., sensors 32 of FIG. 2), received signal strength information, device orientation information from an orientation sensor, information about a usage scenario of device 10, information about whether audio is being played through speaker 26, information from one or more antenna impedance sensors, or other information in determining when antenna 40 is being affected by the presence of nearby external objects or is otherwise in need of tuning. In response, control circuitry 28 may adjust an adjustable inductor, adjustable capacitor, switch, or other tunable component 102 to ensure that antenna 40 operates as desired. Adjustments to component 102 may also be made to extend the coverage of antenna 40 (e.g., to cover desired communications bands that extend over a range of frequencies larger than antenna 40 would cover without tuning).

Figure 4:
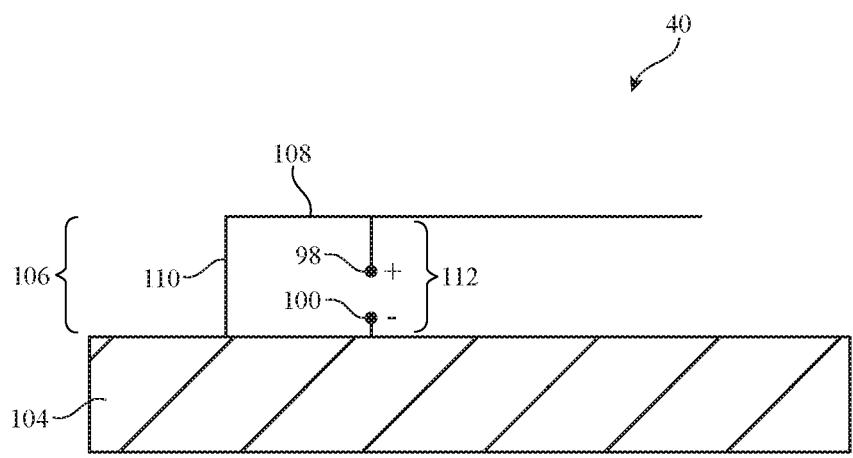
FIG. 4 is a schematic diagram of an illustrative inverted-F antenna in accordance with an embodiment.

FIG. 4 is a diagram of illustrative inverted-F antenna structures that may be used in implementing antenna 40 for device 10. Inverted-F antenna 40 of FIG. 4 has antenna resonating element 106 and antenna ground (ground plane) 104. Antenna resonating element 106 may have a main resonating element arm such as arm 108. The length of arm 108 and/or portions of arm 108 may be selected so that antenna 40 resonates at desired operating frequencies. For example, if the length of arm 108 may be a quarter of a wavelength at a desired operating frequency for antenna 40. Antenna 40 may also exhibit resonances at harmonic frequencies.

Main resonating element arm 108 may be coupled to ground 104 by return path 110.

An inductor or other component may be interposed in path 110 and/or tunable components 102 may be interposed in path 110 and/or coupled in parallel with path 110 between arm 108 and ground 104. If desired, tuning components 102 may be adjusted to interpose a selected one of a number of different inductors in path 110. Additional return paths 110 may be coupled between arm 108 and ground 104 if desired.

Antenna 40 may be fed using one or more antenna feeds. For example, antenna 40 may be fed using antenna feed 112. Antenna feed 112 may include positive antenna feed terminal 98 and ground antenna feed terminal 100 and may run in parallel to return path 110 between arm 108 and ground 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components to support antenna tuning, etc.). For example, arm 108 may have left and right branches that extend outwardly from feed 112 and return path 110. Multiple feeds may be used to feed antennas such as antenna 40.

Figure 5:
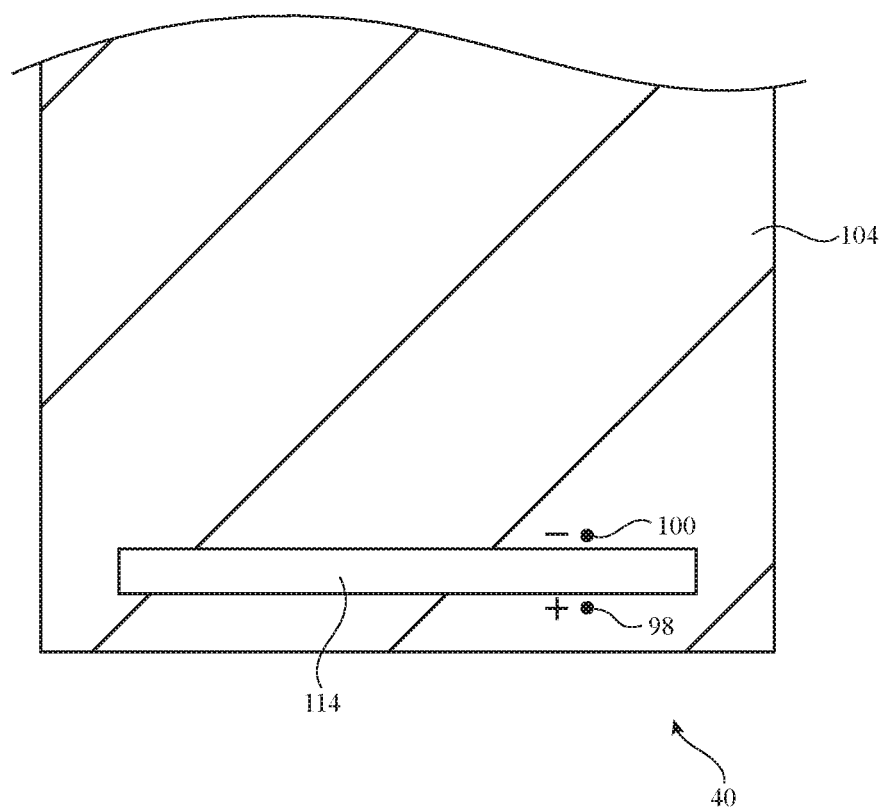
FIG. 5 is a schematic diagram of an illustrative slot antenna in accordance with an embodiment of the present invention.

Antenna 40 may be a hybrid antenna that includes one or more slot antenna resonating elements. As shown in FIG. 5, for example, antenna 40 may be based on a slot antenna configuration having an opening such as slot 114 that is formed within conductive structures such as antenna ground 104. Slot 114 may be filled with air, plastic, and/or other dielectric. The shape of slot 114 may be straight or may have one or more bends (i.e., slot 114 may have an elongated shape following a meandering path). The antenna feed for antenna 40 may include positive antenna feed terminal 98 and ground antenna feed terminal 100. Feed terminals 98 and 100 may, for example, be located on opposing sides of slot 114 (e.g., on opposing long sides). Slot-based antenna resonating elements such as slot antenna resonating element 114 of FIG. 5 may give rise to an antenna resonance at frequencies in which the wavelength of the antenna signals is equal to the perimeter of the slot. In narrow slots, the resonant frequency of a slot antenna resonating element is associated with signal frequencies at which the slot length is equal to a half of a wavelength. Slot antenna frequency response can be tuned using one or more tunable components (e.g., tunable components 102 of FIG. 3) such as tunable inductors or tunable capacitors. These components may have terminals that are coupled to opposing sides of the slot (i.e., the tunable components may bridge the slot). If desired, tunable components may have terminals that are coupled to respective locations along the length of one of the sides of slot 114. Combinations of these arrangements may also be used.

Figure 6:
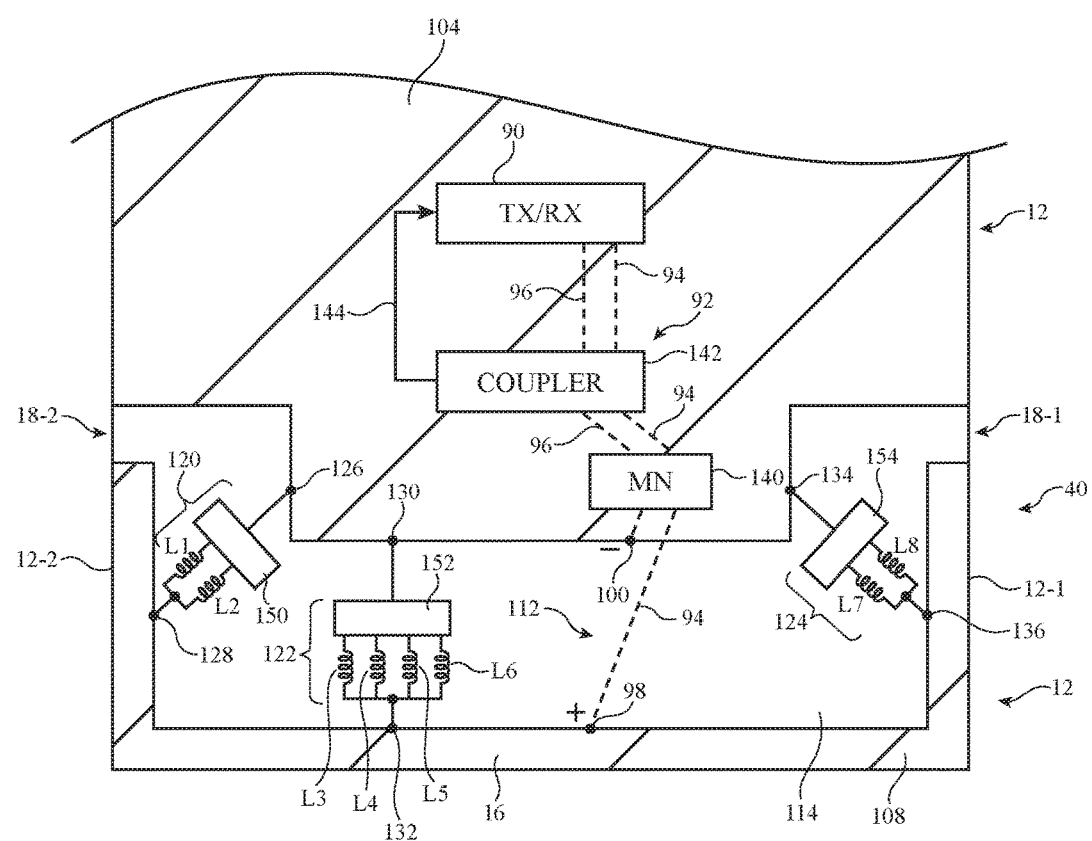
FIG. 6 is diagram of illustrative antenna structures having grip-independent multi-band tuning capabilities in accordance with an embodiment.

Antenna 40 may be a hybrid slot-inverted-F antenna that includes resonating elements of the type shown in both FIG. 4 and FIG. 5. An illustrative configuration for an antenna with slot and inverted-F antenna structures is shown in FIG. 6. As shown in FIG. 6, antenna 40 (e.g., a hybrid slot-inverted-F antenna) may be fed by transceiver circuitry 90 that is coupled to antenna feed 112 over radio-frequency transmission line 92. One or more additional feeds may be coupled to antenna 40, if desired. Antenna 40 may include a slot such as slot 114 that is formed from an elongated gap between peripheral conductive structures 16 and ground 104 (e.g., a slot formed in housing 12 using machining tools or other equipment). The slot may be filled with dielectrics such as air and/or plastic. For example, plastic may be inserted into portions of slot 114 and this plastic may be flush with the outside of housing 12.

Feed 112 may be coupled across slot 114. For example, positive antenna feed terminal 98 may be coupled to peripheral conductive structures 16 whereas ground antenna feed terminal 100 is formed on ground plane 104. Positive antenna feed terminal 98 may be coupled to transceiver 90 over signal conductor 94 of radio-frequency transmission line 92. Ground antenna feed terminal 100 may be coupled to transceiver 90 over ground conductor 96 of radio-frequency transmission line 92.

Portions of slot 114 may contribute slot antenna resonances to antenna 40. Peripheral conductive structures 16 may form an antenna resonating element arm such as arm 108 of FIG. 4 that extends between gaps 18-1 and 18-2 (e.g., gaps 18 in peripheral conductive structures 16 as shown in FIG. 1). The length of antenna resonating element arm 108 (e.g., the portion of peripheral conductive housing structures 16 extending between gaps 18-1 and 18-2) may be selected so that antenna 40 resonates at desired operating frequencies. A return path such as path 110 of FIG. 4 may be formed by a fixed conductive path bridging slot 114 or an adjustable component such as adjustable components 120, 122, and/or 124 (see, e.g., components 102 of FIG. 3). Adjustable components 120, 122, and 124 may sometimes be referred to herein as tuning components, tunable components, tuning circuits, tunable circuits, or adjustable tuning components.

Adjustable component 120 may bridge slot 114 at a first location along slot 114 (e.g., component 120 may be coupled between terminal 126 on ground plane 104 and terminal 128 on peripheral conductive structures 16). Adjustable component 122 may bridge slot 114 at a second location along slot 114 (e.g., component 122 may be coupled between terminal 130 on ground plane 104 and terminal 132 on peripheral conductive structures 16). Adjustable component 124 may bridge slot 114 at a third location along slot 114 (e.g., component 124 may be coupled between terminal 134 on ground plane 104 and a terminal 136 on peripheral conductive structures 16). Terminal 130 may be interposed between ground antenna feed terminal 100 and terminal 126 on ground plane 104. Terminal 132 may be interposed between positive antenna feed terminal 98 and terminal 128 on peripheral conductive structures 16. Ground antenna feed terminal 100 may be interposed between terminal 130 and terminal 134 on ground plane 104. Positive antenna feed terminal 98 may be interposed between terminal 132 and terminal 136 on peripheral conductive structures 16.

Antenna 40 may include an adjustable matching network such as adjustable matching circuitry 140 that is interposed in transmission line path 92. Control circuitry 28 (FIG. 2) may provide control signals to adjust matching circuitry 140 (e.g., to provide a selected matching impedance between transmission line 92 and antenna feed 112).

Coupler circuitry such as coupler 142 (e.g., a directional coupler or other radio-frequency coupler) may be used to tap antenna signals flowing to and from antenna 40. Tapped antenna signals from coupler 142 may be conveyed to control circuitry 28 over coupler path 144 (e.g., via a feedback receiver in transceiver circuitry 90). Coupler path 144 may sometimes be referred to herein as feedback path 144.

The tapped antenna signals may be processed by the feedback receiver and/or control circuitry 28. For example, control circuitry 28 may gather impedance data such as phase and magnitude information from the tapped antenna signals on path 144 to determine the impedance of antenna 40 during operation of wireless circuitry 34. Control circuitry 28 may convert the phase and magnitude values measured using signals over path 144 to complex impedance data points (values). The complex impedance data points may include, for example, scattering parameter values (e.g., values of so-called "S-parameters") that are indicative of the complex impedance of antenna 40. Measurements of the S-parameters may include measured reflection coefficient parameter values (S11 values) that are indicative of the amount of radio-frequency signals that is reflected back towards coupler 142 from antenna 40 during signal transmission, for example. Other impedance measurements may be gathered if desired.

Components 120, 122, and 124 may include switches coupled to fixed components such as inductors for providing adjustable amounts of inductance or an open circuit between ground 104 and peripheral conductive structures 16. This example is merely illustrative and, in general, components 120, 122, and 124 may include other components such as adjustable return path switches, switches coupled to capacitors, or any other desired components.

As shown in FIG. 6, adjustable component 120 includes a radio-frequency switching circuit such as switch 150, adjustable component 122 includes a radio-frequency switching circuit such as switch 152, and adjustable component 124 includes a radio-frequency switching circuit such as switch 154. Adjustable component 120 may include a first inductor L1 and a second inductor L2 coupled in parallel between switch 150 and terminal 128. Adjustable component 122 may include a third inductor L3, a fourth inductor L4, a fifth inductor L5, and a sixth inductor L6 coupled in parallel between switch 152 and terminal 132. Adjustable component 124 may include a seventh inductor L7 and an eighth inductor L8 coupled in parallel between switch 154 and terminal 136. Inductors L1 through L8 may sometimes be referred to herein as switchable inductors. This example is merely illustrative and, in general, components 120, 122, and 124 may include any desired number of inductive, capacitive, resistive, and switching components coupled between ground plane 104 and peripheral conductive structures 16 in any desired manner.

Switches 150 and 154 may each include single-pole double-throw (SP2T) switches and switch 152 may include a single-pole four-throw (SP4T) switch, for example. In this example, switch 150 may have a first state in which inductor L1 is coupled to terminal 126 and inductor L2 is decoupled from terminal 126 and a second state in which inductor L2 is coupled to terminal 126 and inductor L1 is decoupled from terminal 126. Switch 154 may have a first state in which inductor L7 is coupled to terminal 134 and inductor L8 is decoupled from terminal 134 and a second state in which inductor L8 is coupled to terminal 134 and inductor L7 is decoupled from terminal 134. Switch 152 may have a first state at which inductor L3 is coupled to terminal 130 and inductors L4, L5, and L6 are decoupled from terminal 130, a second state at which inductor L4 is coupled to terminal 130 and inductors L3, L5, and L6 are decoupled from terminal 130, a third state at which inductor L5 is coupled to terminal 130 and inductors L3, L4, and L6 are decoupled from terminal 130, and a fourth state at which inductor L6 is coupled to terminal 130 and inductors L3, L4, and L5 are decoupled from terminal 130.

This example is merely illustrative. If desired, switch 150 may have a third state in which both inductors L1 and L2 are decoupled from terminal 126 (e.g., in which adjustable component 120 forms an open circuit between terminal 126 and terminal 128) and/or a fourth state at which both inductors L1 and L2 are coupled to terminal 126. If desired, switch 154 may have a third state at which both inductors L7 and L8 are decoupled from terminal 134 (e.g., in which adjustable component 124 forms an open circuit between terminals 134 and 136) and/or a fourth state at which both inductors L7 and L8 are coupled to terminal 134. If desired, switch 152 may have multiple additional states at which any desired combination of inductors L3, L4, L5, and L6 are coupled to terminal 130 or at which an open circuit is formed between terminals 130 and 132. If desired, switches 120, 122, and/or 124 may have additional states at which short circuit paths (e.g., short circuit paths without inductors) are connected between ground 104 and peripheral conductive structures 16.

Adjustable matching circuitry 140 may include switching circuitry and circuit components such as resistive, capacitive, and/or inductive components coupled in any desired manner between transmission line 92, ground 104, antenna feed 112, and/or antenna resonating element arm 108. The switching circuitry in adjustable matching circuitry 140 may be controlled to place circuitry 140 in one of any desired number of states. Matching circuitry 140 may exhibit different impedances in each of the states. For example, matching circuitry 140 may have a first state at which matching circuitry 140 exhibits a first impedance and a second state at which matching circuitry exhibits a second impedance. If desired, matching circuitry 140 may include an SP2T switch that switches matching network 140 between the first and second impedances. As one example, matching network 140 may include a first (shunt) inductor coupled in series with a first single-pole single-throw switch between positive signal path 94 and ground 104 and a second (shunt) inductor coupled in series with a second single-pole single-throw switch between positive signal path 94 and ground 104. The first single-pole single-throw switch may be opened and the second single-pole single-throw switch may be closed in the first state whereas the first switch is closed and the second switch is opened in the second state, for example. This is merely illustrative and, in general, any desired components may be formed in matching network 140.

Using multiple adjustable components at different locations along slot 114 may provide antenna 40 with flexibility to accommodate different loading conditions (e.g., different loading conditions that may arise due to the presence of a user's hand or other external object on various different portions of device 10 adjacent to various different corresponding portions of antenna 40). Adjustable components in antenna 40 may be used to tune antenna coverage, may be used to restore antenna performance that has been degraded due to the presence of an external object such as a hand or other body part of a user, and/or may be used to adjust for other operating conditions and to ensure satisfactory operation at desired frequencies. Adjustable components 120, 122, and 124, and matching circuitry 140 may be controlled (i.e., placed in a desired state) using control signals received from control circuitry 28.

Slot 114 may have an elongated shape (e.g., a slot shape) or other suitable elongated gap shape. In the example of FIG. 6, slot 114 has a U shape that runs along the periphery of device 10 between peripheral conductive structures 16 (e.g., housing sidewalls) and portions of the rear wall of device 10 (e.g., ground 104). The ends of slot 114, which may sometimes be referred to as open ends, may be formed by gaps 18 (e.g., gaps 18-1 and 18-2 of FIG. 6). The length of slot 114 may be about 4-20 cm, more than 2 cm, more than 4 cm, more than 8 cm, more than 12 cm, less than 25 cm, less than 15 cm, less than 10 cm, or other suitable length. Slot 114 may have a width of about 2 mm (e.g., less than 4 mm, less than 3 mm, less than 2 mm, more than 1 mm, more than 1.5 mm, 1-3 mm, etc.) or other suitable width. In the example of FIG. 6, slot 114 has a U shape. If desired, slot 114 may have other shapes such as the straight slot shape.

Figure 7:
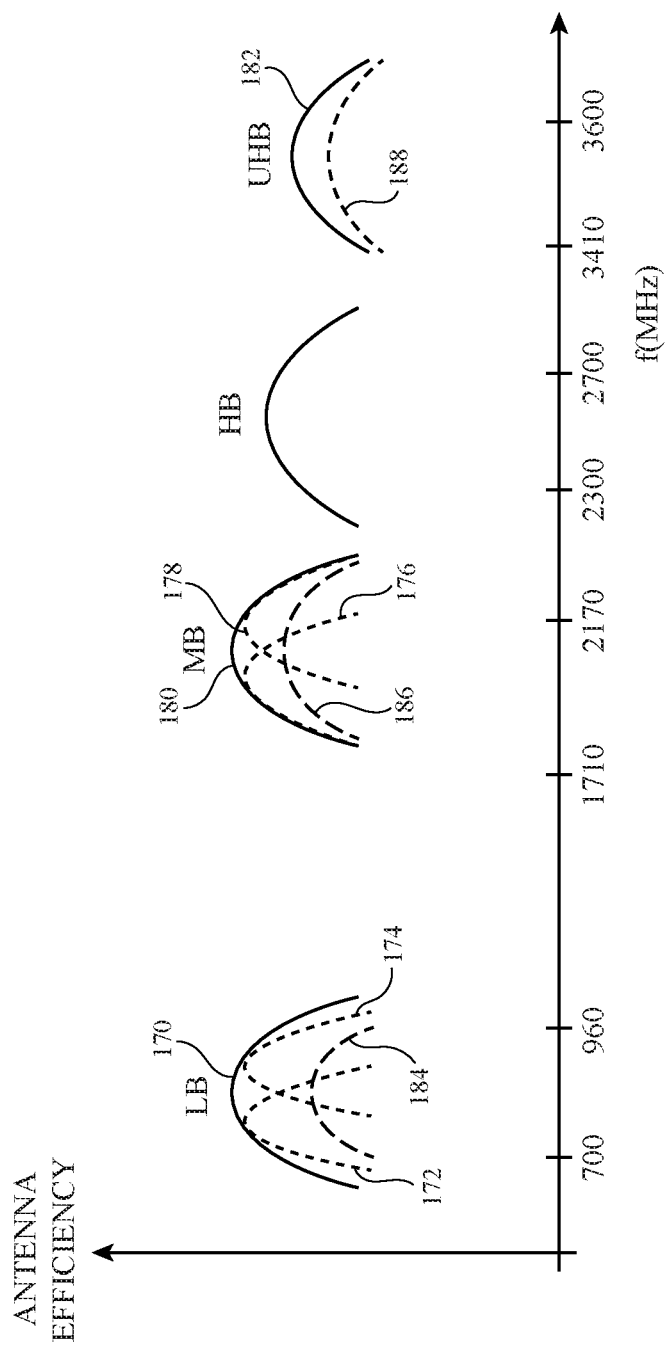
FIG. 7 is a graph in which antenna efficiency has been plotted as a function of operating frequency in accordance with an embodiment.

FIG. 7 is a graph in which antenna efficiency has been plotted as a function of operating frequency f for an illustrative antenna such as antenna 40 of FIG. 6. As shown in FIG. 7, antenna 40 may exhibit resonances in a low band LB, midband MB, high band HB, and ultra-high band UHB. This example is merely illustrative and, if desired, antenna 40 may exhibit resonances in a subset of these bands and/or in additional bands (e.g., a low-middle band LMB extending from 1400 MHz to 1710 MHz or other suitable frequency ranges).

Low band LB may extend from 700 MHz to 960 MHz or other suitable frequency range. Peripheral conductive structures 16 may serve as an inverted-F resonating element arm such as arm 108 of FIG. 4. The resonance of antenna 40 at low band LB may be associated with the distance along peripheral conductive structures 16 between feed 112 of FIG. 6 and gap 18-2, for example. Gap 18-2 may be one of gaps 18 in peripheral conductive housing structures 16. FIG. 6 is a view from the front of device 10, so gap 18-2 of FIG. 6 lies on the left edge of device 10 when device 10 is viewed from the front (e.g., the side of device 10 on which display 14 is formed) and lies on the right edge of device 10 when device 10 is viewed from behind. Tunable components such as components 122, 120, 124, and/or matching circuitry 140 may be used to tune the response of antenna 40 in low band LB. As shown in FIG. 7, antenna 40 may have an antenna efficiency characterized by curve 170 in low band LB. The antenna efficiency of curve 170 may be achieved by tuning antenna 40 to place antenna 40 in one of two or more tuning states (e.g., a first state characterized by curve 172, a second state characterized by curve 174, etc.).

High band HB may extend from 2300 MHz to 2700 MHz or other suitable frequency range. Antenna performance in high band HB may be supported by a parasitic antenna resonating element associated with antenna 40, for example. The parasitic antenna resonating element may be formed from conductive structures such as conductive housing structures (e.g., an integral portion of housing such as a portion of housing 12 forming ground 104), from parts of conductive housing structures, from parts of electrical device components, from printed circuit board traces, from strips of conductor (e.g., strips of conductor or elongated portions of ground 104 that are embedded or molded into slot 114), or other conductive materials. In one suitable arrangement, the parasitic antenna resonating element may be coupled to antenna resonating element 108 (e.g., peripheral structures 16) by near-field electromagnetic coupling (e.g., the parasitic element may be indirectly fed via near-field coupling whereas peripheral structures 16 are directly fed using antenna feed 112). As an example, the parasitic antenna resonating element may be based on a slot antenna resonating element structure formed from a portion of slot 114 (e.g., a slot for a slot-based parasitic antenna resonating element may be formed between opposing metal structures in peripheral structures 16 and/or antenna ground 104). In another suitable arrangement, antenna performance in high band HB may be supported by a harmonic mode of a resonance supported by antenna arm 108.

Midband MB may extend from 1710 MHz to 2170 MHz or other suitable frequency range. The resonance of antenna 40 at midband MB may be associated with the distance along peripheral conductive structures 16 between component 120 of FIG. 6 and feed 112 and/or the distance along peripheral conductive structures 16 between feed 112 and gap 18-1, for example. Antenna 40 may exhibit first and second resonances in midband MB (e.g., resonances at different frequencies within midband MB as shown by curves 176 and 178). Tunable components such as components 122, 120, 124, and/or matching circuitry 140 may be used to tune the response of antenna 40 in midband MB. As shown in FIG. 7, antenna 40 may have an antenna efficiency characterized by curve 180 in midband MB. The antenna efficiency of curve 180 may be achieved by tuning antenna 40 to place antenna 40 in one of two or more tuning states (e.g., a first state characterized by curve 176, a second state characterized by curve 178, etc.).

Ultra-high band UHB may extend from 3400 MHz to 3800 MHz or other suitable frequency range. Antenna performance in ultra-high band UHB may be supported by a harmonic mode of one of the other resonances supported by antenna 40, as an example.

The presence or absence of external objects such as a user's hand or other body part in the vicinity of antenna 40 may affect antenna loading and therefore antenna performance. For example, in free space, the midband performance of antenna 40 may be characterized by curve 176, the low band performance of antenna 40 may be characterized by curve 170, and the ultra-high band performance of antenna 40 may be characterized by curve 182 of FIG. 7. In the presence of external loading, however, efficiency may be degraded (see, e.g., degraded efficiency curves 184, 186, and 188).

Antenna loading may differ depending on the way in which device 10 is being held. For example, antenna loading and therefore antenna performance may be affected in one way when a user is holding device 10 in the user's right hand and may be affected in another way when a user is holding device 10 in the user's left hand. To accommodate various loading scenarios, device 10 may use sensor data, antenna measurements, and/or other data from input-output circuitry 30 to monitor for the presence of antenna loading (e.g., the presence of a user's hand or other external object). Device 10 (e.g., control circuitry 28) may then adjust adjustable components 102 in antenna 40 to compensate for the loading. With compensation, the performance of an antenna that is being loaded may be restored from a degraded efficiency curve such as curves 184, 186, and 188 of FIG. 7 to unimpaired (free space) efficiency curves 170, 176, and 182. Similarly, the presence of antenna loading can detune the antenna in different bands. For example, if antenna 40 is intended to be tuned to a midband frequency associated with curve 178, the antenna loading can detune the antenna to exhibit a detuned resonance as shown by curve 186 or can otherwise reduce the antenna efficiency in midband MB (e.g., as shown by curve 186). With compensation, the performance of the antenna that is being loaded may be restored to unimpaired curve 178. Similarly, if antenna 40 is intended to be tuned to a low band frequency associated with curve 174, the antenna loading can detune the antenna to exhibit a detuned resonance as shown by curve 172, or can otherwise reduce the antenna efficiency in low band LB (e.g., as shown by curve 184). With compensation, the performance of the antenna that is being loaded may be restored to unimpaired curve 174.

In compensating for antenna loading, control circuitry 28 may control adjustable component (circuit) 120 (e.g., using control signals supplied to component 120) to apply a desired inductance value (e.g., L1 or L2) or to create an open circuit between terminals 128 and 126. Control circuitry 28 may control adjustable component 122 to apply a desired inductance value (e.g., L3, L4, L5, or L6) or to create an open circuit between terminals 130 and 132. Control circuitry 28 may control adjustable component 124 to apply a desired inductance value (e.g., L7 or L8) or to create an open circuit between terminals 134 and 136. Control circuitry 28 may control matching circuitry 140 to exhibit a selected one of a number of possible impedances.

As shown in FIG. 6, housing edge 12-1 is associated with the right edge of housing 12 when device 10 is viewed from the front and edge 12-2 is associated with the left edge of housing 12 when device 10 is viewed from the front. When a user is holding device 10 in the user's right hand, the palm of the user's right hand will rest along edge 12-1 of housing 12 and the fingers of the user's right hand (which do not load antenna 40 as much as the user's palm) will rest along edge 12-2 of housing 12. Device 10 may typically be oriented in a first orientation (e.g., a first range of orientations) when being held to the user's head with the user's right hand. In this situation, loading from the user's hand may affect the midband resonance associated with the distance between feed 112 and gap 18-1. In addition, the user's palm may form a short circuit across gap 18-1 or otherwise alter a capacitance between arm 108 and ground 104 associated with gap 18-1.

When a user is holding device 10 in the user's left hand, the palm of the user's left hand will rest along the left edge of device 10 (e.g., housing edge 12-2 of FIG. 6) and the fingers of the user's left hand will rest along edge 12-1 of device 10. In this scenario, the palm of the user's hand may load the portion of antenna 40 near to edge 12-2. Device 10 may typically be oriented in a second orientation (e.g., a second range of orientations) when being held to the user's head in with the user's left hand. In addition, the user's palm may form a short circuit across gap 18-2 or otherwise alter a capacitance associated with gap 18-2.

To ensure that antenna 40 operates satisfactorily when the user's right hand is being used to grip device 10 and when the user's left hand is being used to grip device 10 as well as during free space conditions, control circuitry 28 may determine which type of operating environment is present and may adjust the adjustable circuitry of antenna 40 accordingly to compensate. Control circuitry 28 may, in general, use any suitable type of sensor measurements, wireless signal measurements, or antenna measurements to determine how device 10 is being used. For example, control circuitry 28 may use sensors such as temperature sensors, capacitive proximity sensors, light-based proximity sensors, resistance sensors, force sensors, touch sensors, or other sensors to detect the presence of user's hand or other object on the left or right side of device 10. Control circuitry 28 may also use information from an orientation sensor in device 10 to help determine whether device 10 is being held in a position characteristic of right hand use or left hand use (or is being operated in free space). If desired, an impedance sensor such as coupler 142 or other sensor may be used in monitoring the impedance of antenna 40 or part of antenna 40. Different antenna loading scenarios may load antenna 40 differently, so impedance measurements may help determine whether device 10 is being gripped by a user's left or right hand or is being operated in free space. Another way in which control circuitry 28 may monitor antenna loading conditions involves making received signal strength measurements on radio-frequency signals being received with antenna 40. The adjustable circuitry of antenna 40 can be toggled between different settings and an optimum setting for antenna 40 can be identified by choosing a setting that maximizes received signal strength.

Adjustable components 120, 122, and 124 may sometimes be collectively referred to herein as aperture tuning circuitry (e.g., because components 120, 122, and 124 may tune the resonance of slot aperture 114 between ground plane 104 and conductive structures 16). Adjustable matching network 140 may sometimes be referred to herein as impedance tuning circuitry. The impedance tuning circuitry may include any other desired components coupled between different portions of peripheral structures 16 and/or ground 104 if desired. The aperture tuning circuitry may include other components coupled between different portions of resonating element arm 108 if desired.

Figure 8:
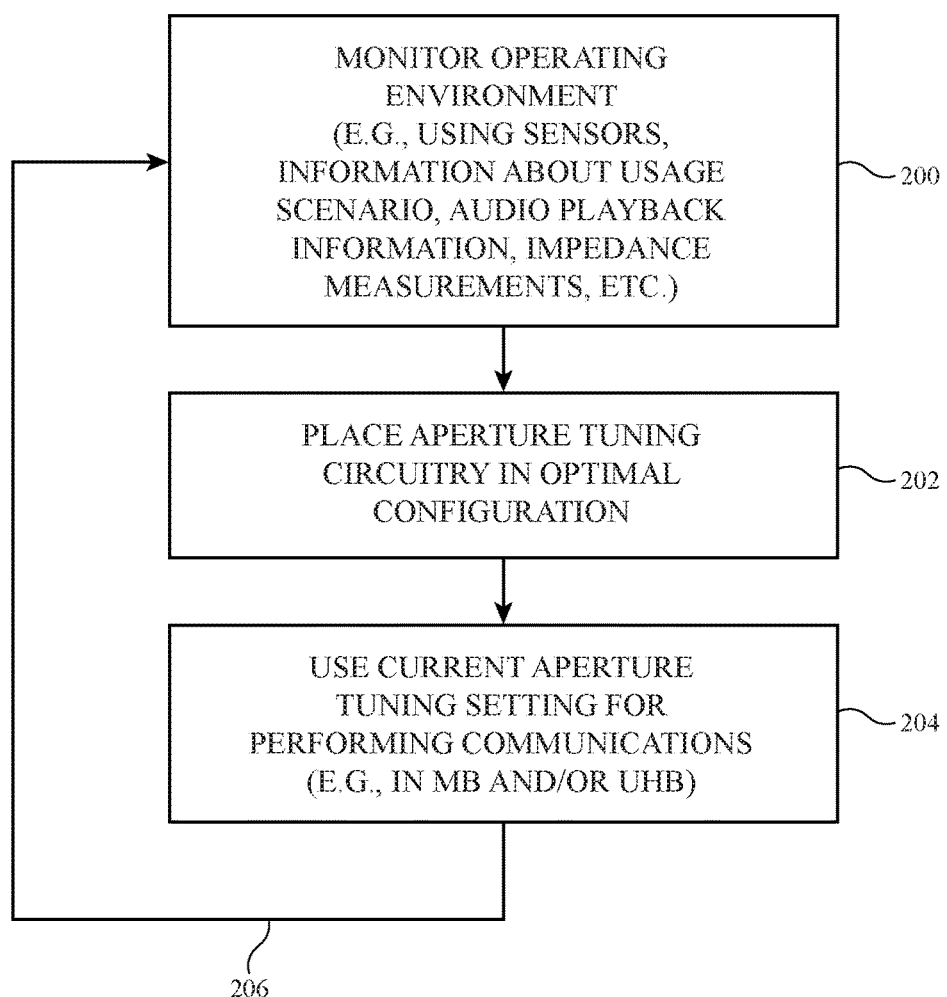
FIG. 8 is a flow chart of illustrative steps that may be involved in performing mid band and ultra-high band antenna tuning using an antenna of the type shown in FIG. 6 in accordance with an embodiment.

In practice, the particular adjustments that are performed by tuning components 120, 122, 124, and 140 to compensate for antenna loading variations depend on the frequency band of interest. For example, first adjustments may be required to ensure satisfactory antenna efficiency when operating in midband MB and ultra-high band UHB whereas second adjustments may be required to ensure satisfactory antenna efficiency when operating in low band LB. FIG. 8 is a flow chart of illustrative steps involved in operating device 10 to ensure satisfactory performance for antenna 40 in midband MB and ultra-high band UHB.

At step 200 of FIG. 8, control circuitry 28 may monitor the operating environment of device 10. Control circuitry 28 may, in general, use any suitable type of sensor measurements, wireless signal measurements, operation information, or antenna measurements to determine how device 10 is being used (e.g., to determine the operating environment of device 10). For example, control circuitry 28 may use sensors such as temperature sensors, capacitive proximity sensors, light-based proximity sensors, resistance sensors, force sensors, touch sensors, sensors that detect whether wired or wireless headphones are being used with device 10, sensors that identify a type of headphone or accessory device that is being used with device 10, or other sensors to determine how device 10 is being used.

If desired, control circuitry 28 may use device orientation sensor circuitry such as an inertial measurement unit to identify the orientation of device 10. Inertial measurement units may include, for example, accelerometers that measure the orientation of the Earth's gravitational field and that can therefore measure the orientation and motion of device 10, may include gyroscopes (gyroscopic sensors) that measure motion device 10 (e.g., angular motion), and/or sensors such as compasses (e.g., magnetic sensors, sometimes referred to as magnetometers) that measure orientation and that can therefore measure device movement. Inertial measurement units (e.g., microelectromechanical systems sensors) that include 3-axis accelerometer sensors, 3-axis gyroscopes, and 3-axis compasses may be used, for example. Information from a device orientation sensor such as an accelerometer in device 10 may be processed by control circuitry 28 to help determine whether device 10 is being held in a position characteristic of right hand use or left hand use (or is being operated in free space).

In a scenario where control circuitry 28 processes orientation information for determining the operating environment of device 10, the orientation information may be gathered using an accelerometer from input-output devices 32 (FIG. 2), for example. The accelerometer may measure a gravity vector having a direction that points towards the earth. Control circuitry 28 may identify the direction of the gravity vector to determine whether device 10 is being held by the user's left or right hand. For example, the gravity vector may have a first component that generally has a positive value when device 10 is being held by the user's left hand and a negative value when device 10 is being held by the user's right hand. Control circuitry 28 may identify the sign of this component of the gravity vector to determine whether device 10 is being held by the user's left or right hand. This is merely illustrative and, in general, any desired sensor data may be used.

If desired, control circuitry 28 may use information about a usage scenario of device 10 in determining how device 10 is being used (e.g., information identifying whether audio data is being transmitted through ear speaker 26 of FIG. 1, information identifying whether a telephone call is being conducted, information identifying whether a microphone on device 10 is receiving voice signals, etc.).

If desired, control circuitry 28 may use an impedance sensor such as coupler 142 in monitoring the impedance of antenna 40 or part of antenna 40. For example, control circuitry 28 may gather complex impedance values such as S11 measurements using signals gathered by coupler 142 that are indicative of the loading of antenna 40. Different antenna loading scenarios may load antenna 40 differently, so impedance measurements may help determine whether device 10 is being gripped by a user's left or right hand or is being operated in free space.

In general, any desired combinations of one or more of these measurements or other measurements may be processed by control circuitry 28 to identify how device 10 is being used (i.e., to identify the operating environment of device 10).

At step 202, control circuitry 28 may adjust the configuration of the aperture tuning circuitry in antenna 40 (i.e., components 120, 122, and 124) based on the current operating environment of device 10 (e.g., based on data or information gathered while processing step 200). Control circuitry 28 may adjust the configuration of the aperture tuning circuitry by controlling the aperture tuning circuitry using one of a number of different sets of aperture tuning settings. Control circuitry 28 may select the set of aperture tuning settings to use based on the current operating environment of device 10 (e.g., circuitry 28 may select the optimal set of aperture tuning settings under current antenna loading conditions). As examples, controlling the aperture tuning circuitry using a first set of aperture tuning settings may involve controlling component 120 to couple one of inductors L1 and L2 to terminal 126 (e.g., to perform midband tuning using component 120) and setting components 122 and 124 to form open circuits, whereas controlling the aperture tuning circuitry using a second set of aperture tuning settings may involve controlling component 124 to couple one of inductors L7 and L8 to terminal 134 (e.g., to perform midband tuning using component 124) and setting components 120 and 122 to form open circuits. This is merely illustrative and, in general, each set of aperture tuning settings may involve controlling components 120, 122, and 124 using any desired settings. Each set of aperture tuning settings may include different aperture tuning settings for components 120, 122, and 124 depending on whether antenna 40 is being operated in midband MB or ultra-high band UHB. Control circuitry 28 may select which of these first and second sets of aperture tuning settings to use (or additional sets of aperture tuning settings to use) based on the current operating environment of device 10.

As an example, control circuitry 28 may select the set of aperture tuning settings to use based on whether the data gathered while processing step 200 indicates that device 10 is being held to the user's head by the user's right hand, whether device 10 is being held to the user's head by the user's left hand, or whether device 10 is in some other operating environment (e.g., a free space environment). If control circuitry 28 determines that device 10 is being held to the by the user's right hand, control circuitry 28 may place antenna 40 in a right hand mode (e.g., by controlling aperture tuning components 120, 122, and 124 using a first set of aperture tuning settings). If control circuitry 28 determines that device 10 is being held by the user's left hand, control circuitry 28 may place antenna 40 in the left hand mode (e.g., by controlling aperture tuning components 120, 122, and 124 using a second set of aperture tuning settings). If control circuitry 28 determines that device 10 is in any other operating environment, control circuitry 28 may place antenna 40 in a default or free space mode (e.g., by controlling aperture tuning components using a third set of aperture tuning settings). By placing antenna 40 in one of these modes (e.g., in an optimal one of these modes), control circuitry 28 may ensure that antenna 40 operates satisfactorily in midband MB and ultra-high band UHB regardless of how the user is holding device 10.

One or more different measurements about the operating environment of device 10 (e.g., as gathered while processing step 200) may be used in selecting the set of aperture tuning settings to use. For example, control circuitry 28 may determine whether audio is being played through ear speaker 26, may use an accelerometer to determine whether device 10 is in motion, and may gather proximity sensor information using a proximity sensor. Control circuitry 28 may turn on a device orientation sensor to determine whether device 10 is being held in a user's left or right hand in response to determining that audio is being played through ear speaker 26, that device 10 is in motion, and that an external object is in proximity to device 10. This may, for example, reduce overall power consumption in device 10 relative to scenarios in which control circuitry 28 continuously gathers orientation sensor data to determine whether device 10 is being held in a user's left or right hand, as such a determination is only performed after other device information indicates that there is a relatively high probability that the user's hand is loading antenna 40.

At step 204, antenna 40 may be used to transmit and receive wireless data using the current set of aperture tuning settings for components 120, 122, and 124 (e.g., as set during step 202). This process may be performed continuously, as indicated by line 206. The example of FIG. 8 is merely illustrative. If desired, matching circuitry 140 may be adjusted while processing step 202. While the operations of FIG. 8 are described in connection with performing antenna adjustments while operating in midband MB and ultra-high band UHB, the antenna adjustments may be performed while operating in any desired communication bands.

Figure 9:
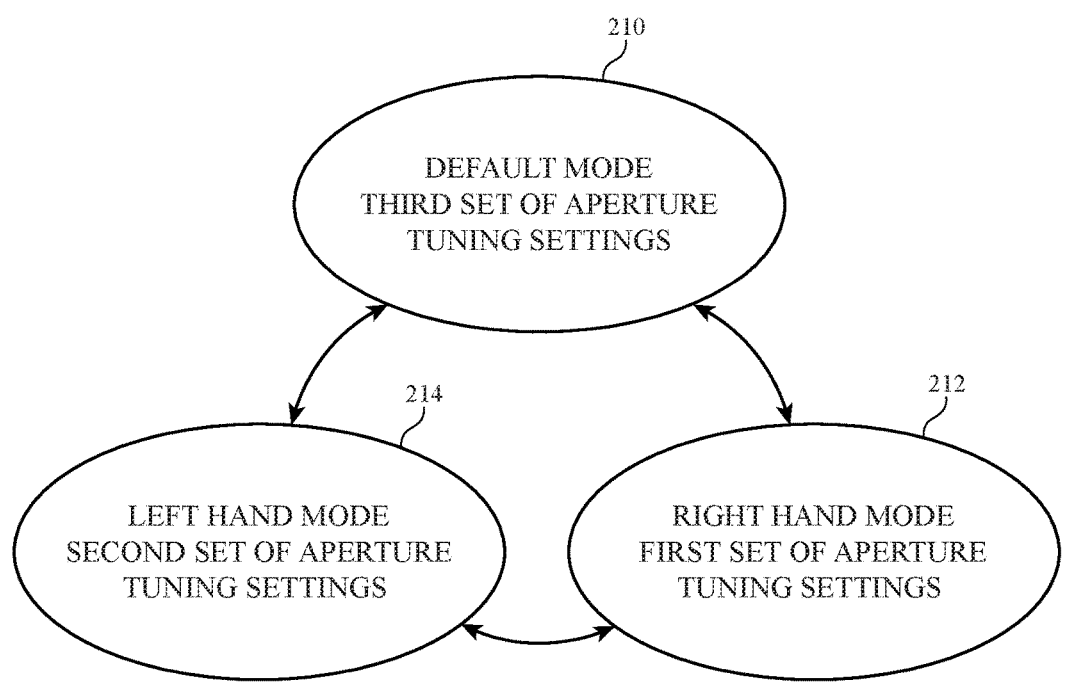
FIG. 9 is a state diagram showing illustrative mid band and ultra-high band antenna operating modes for an electronic device in accordance with an embodiment.

A state diagram showing illustrative operating modes for device 10 in performing wireless communications in midband MB and ultra-high band UHB using antenna 40 is shown in FIG. 9.

If it is determined that device 10 is being held in the right hand of a user (i.e., a non-free-space mode in which antenna 40 is being loaded along edge 12-1), control circuitry 28 may adjust the circuitry of antenna 40 to place device 10 in right hand mode 212. Control circuitry 28 may place device 10 in right hand mode 212 by controlling aperture tuning circuitry 120, 122, and 124 using a first set of aperture tuning settings. The first set of aperture tuning settings may include any desired combination of settings for components 120, 122, and 124. As an example, when handling midband MB, control circuitry 28 may control switch 150 to couple a given one of inductors L1 and L2 to terminal 126 (e.g., dependent upon whether resonance 176 or resonance 178 within midband MB as shown in FIG. 7 is to be covered). When controlled using the first set of aperture tuning settings, control circuitry 28 may toggle switch 150 to change the particular midband frequency that is used over time. In other words, when controlled using the first set of aperture tuning settings, control circuitry 28 may use component 120 to perform midband tuning for antenna 40. Control circuitry 28 may control switch 152 to form an open circuit between terminals 130 and 132. Control circuitry 28 may control switch 154 to form an open circuit between terminals 134 and 136. If desired, control circuitry 28 may control switch 154 to any arbitrary state (e.g., with one, both, or none of inductors L7 and L8 coupled to terminal 134) because, in the right hand mode, the user's palm may short currents from arm 108 to ground 104 across gap 18-1, thereby minimizing the effect of component 124 on the resonance of antenna 40.

If desired, the first set of aperture tuning settings may include different settings for components 120, 122, and 124 when antenna 40 is being used to handle signals in ultra-high band UHB. For example, when handling ultra-high band UHB using the first set of aperture tuning settings, control circuitry 28 may control switch 152 to couple one or more of inductors L3, L4, L5, and L6 to terminal 130 in addition to controlling component 120 to couple a given one of inductors L1 and L2 to terminal 126 (e.g., both components 120 and 122 may contribute to ultra-high band tuning for antenna 40). This example is merely illustrative and, in general, components 120, 122, and 124 may be placed in any desired configuration when operated using the first set of aperture tuning settings (e.g., while device is operated in right hand mode 212).

If it is determined that device 10 is being held in the left hand of a user (i.e., a non-free-space mode in which antenna 40 is being loaded along edge 12-2), control circuitry 28 may adjust the circuitry of antenna 40 to place device 10 in left hand mode 214. Control circuitry 28 may place device 10 in left hand mode 214 by controlling aperture tuning circuitry 120, 122, and 124 using a second set of aperture tuning settings. The second set of aperture tuning settings is different from the first set of aperture tuning settings associated with right hand mode 212. The second set of aperture tuning settings may include any desired combination of settings for components 120, 122, and 124 that is different from the combination of settings for components 120, 122, and 124 associated with the first set of aperture tuning settings.

As an example, when handling midband MB, control circuitry 28 may control switch 154 to couple a given one of inductors L7 and L8 to terminal 134 (e.g., dependent upon whether resonance 176 or resonance 178 of FIG. 7 is to be covered). When controlled using the second set of aperture tuning settings, control circuitry 28 may toggle switch 154 to change the particular midband frequency that is used over time. In other words, when controlled using the second set of aperture tuning settings, control circuitry 28 may use component 124 to perform midband tuning for antenna 40. Control circuitry 28 may control switch 152 to form an open circuit between terminals 130 and 132. Control circuitry 28 may control switch 150 to form an open circuit between terminals 134 and 136. If desired, control circuitry 28 may control switch 150 to any arbitrary state (e.g., with one, both, or none of inductors L1 and L2 coupled to terminal 126) because, in the left hand mode, the user's palm may short currents from arm 108 to ground 104 across gap 18-2, thereby minimizing the effect of component 120 on the resonance of antenna 40.

If desired, the second set of aperture tuning settings may include different settings for components 120, 122, and 124 when antenna 40 is being used to handle signals in ultra-high band UHB. For example, when handling ultra-high band UHB using the second set of aperture tuning settings, control circuitry 28 may control switch 152 to couple one or more of inductors L3, L4, L5, and L6 to terminal 130 in addition to controlling component 124 to couple a given one of inductors L7 and L8 to terminal 134 (e.g., both components 124 and 122 may contribute to ultra-high band tuning for antenna 40). This example is merely illustrative and, in general, components 120, 122, and 124 may be placed in any desired configuration when operated using the second set of aperture tuning settings (e.g., while device is operated in left hand mode 214).

If it is determined that device 10 is operating in a free space mode or that device 10 is operating in neither the left hand mode nor the right hand mode, control circuitry 28 may adjust the circuitry of antenna 40 to place device 10 in default (free space) mode 210. Control circuitry 28 may place device 10 in default mode 210 by controlling aperture tuning circuitry 120, 122, and 124 using a third set of aperture tuning settings. The third set of aperture tuning settings may be different from the first and second sets of aperture tuning settings associated with the right and left hand modes. In another suitable arrangement, the third set of aperture tuning settings may be identical to either the first set of aperture tuning settings associated with right hand mode 212 or the second set of aperture tuning settings associated with left hand mode 214.

In each of modes 210, 212, and 214, control circuitry 28 may collect and analyze sensor data such as proximity sensor data, orientation sensor data, temperature sensor data, and other sensor data, may collect and analyze received signal strength data, call state data, and other wireless settings, and may collect and analyze antenna performance information such as antenna impedance information (e.g., S11 values) and other antenna feedback information (e.g., while performing step 200 of FIG. 8) to determine whether device 10 is being used in one of the other modes that loads antenna 40 in a way that can be compensated by adjusting the adjustable circuitry of antenna 40. When it is determined that the antenna loading has changed, control circuitry 28 may adjust the aperture tuning settings to adjust device 10 between modes 210, 212, and 214 to compensate for the change in antenna loading (e.g., while processing step 202 of FIG. 8).

For example, if device 10 is being held in a user's left hand and device 10 is currently in right hand mode 212 (e.g., antenna 40 is currently tuned using the first set of aperture tuning settings), antenna loading from the user's left hand may cause antenna 40 to exhibit deteriorated antenna efficiency (e.g., as shown by curves 186 and 188 of FIG. 7). By adjusting device 10 to left hand mode 214 (e.g., by controlling antenna 40 using the second set of aperture tuning settings), antenna 40 may exhibit satisfactory antenna efficiency (e.g., as shown by curves 176 and 182 of FIG. 7). Similarly, if device 10 is being held in a user's right hand and device 10 is currently operated in left hand mode 214 (e.g., antenna 40 is currently tuned using the second set of aperture tuning settings), antenna loading from the user's right hand may cause antenna 40 to exhibit deteriorated antenna efficiency (e.g., as shown by curves 186 and 188). By placing device 10 in right hand mode 212 (e.g., by controlling antenna 40 using the first set of aperture tuning settings), antenna 40 may exhibit satisfactory antenna efficiency (e.g., as shown by curves 176 and 182).

If desired, control circuitry 28 may process impedance data (e.g., S11 measurements) to determine whether the user's hand is covering one, both, or neither of gaps 18-2 and 18-1. Control circuitry 28 may use this information about whether the user's hand is covering one, both, or neither of gaps 18-1 and 18-2 in selecting the set of aperture tuning settings to use. For example, control circuitry 28 may compare the magnitude of gathered S11 values to a pre-calibrated range of S11 values that are known to be associated with the user's hand covering only a single one of gaps 18-1 and 18-2. The range of S11 values may be defined between (e.g., defined by) a minimum S11 magnitude threshold value and a maximum S11 magnitude threshold value. If control circuitry 28 determines that gathered S11 values are within the predetermined range (e.g., greater than the minimum S11 magnitude threshold value and less than the maximum S11 magnitude threshold value), control circuitry 28 may determine that only one of gaps 18-1 and 18-2 are covered. If control circuitry 28 determines that the gathered S11 values are less than the minimum S11 magnitude threshold value, control circuitry 28 may determine that neither or both of gaps 18-1 and 18-2 are covered. If desired, control circuitry 28 may place antenna 40 in left hand mode 214 in response to determining that only one gap is covered and that device 10 is being held by the user's left hand (e.g., using orientation sensor data or any other desired data gathered while processing step 200). Control circuitry 28 may place antenna 40 in right hand mode 212 in response to determining that only one gap is covered and that device 10 is being held in the user's right hand. Control circuitry 28 may place antenna 40 in default mode 210 in response to determining that neither or both of gaps 18-1 and 18-2 are covered.

The example of FIG. 9 is merely illustrative. If desired, device 10 may be operated in more than three midband and ultra-high band tuning states (e.g., antenna 40 may be controlled using four or more sets of aperture tuning settings). If desired, matching network 140 may be placed in different configurations in each state. While described above in connection with midband MB and ultra-high band UHB, each state may control antenna tuning in any desired frequency band. If desired, control circuitry 28 may perform different antenna adjustments to ensure satisfactory antenna efficiency for antenna 40 under different antenna loading conditions while operating in low band LB.

Figure 10:
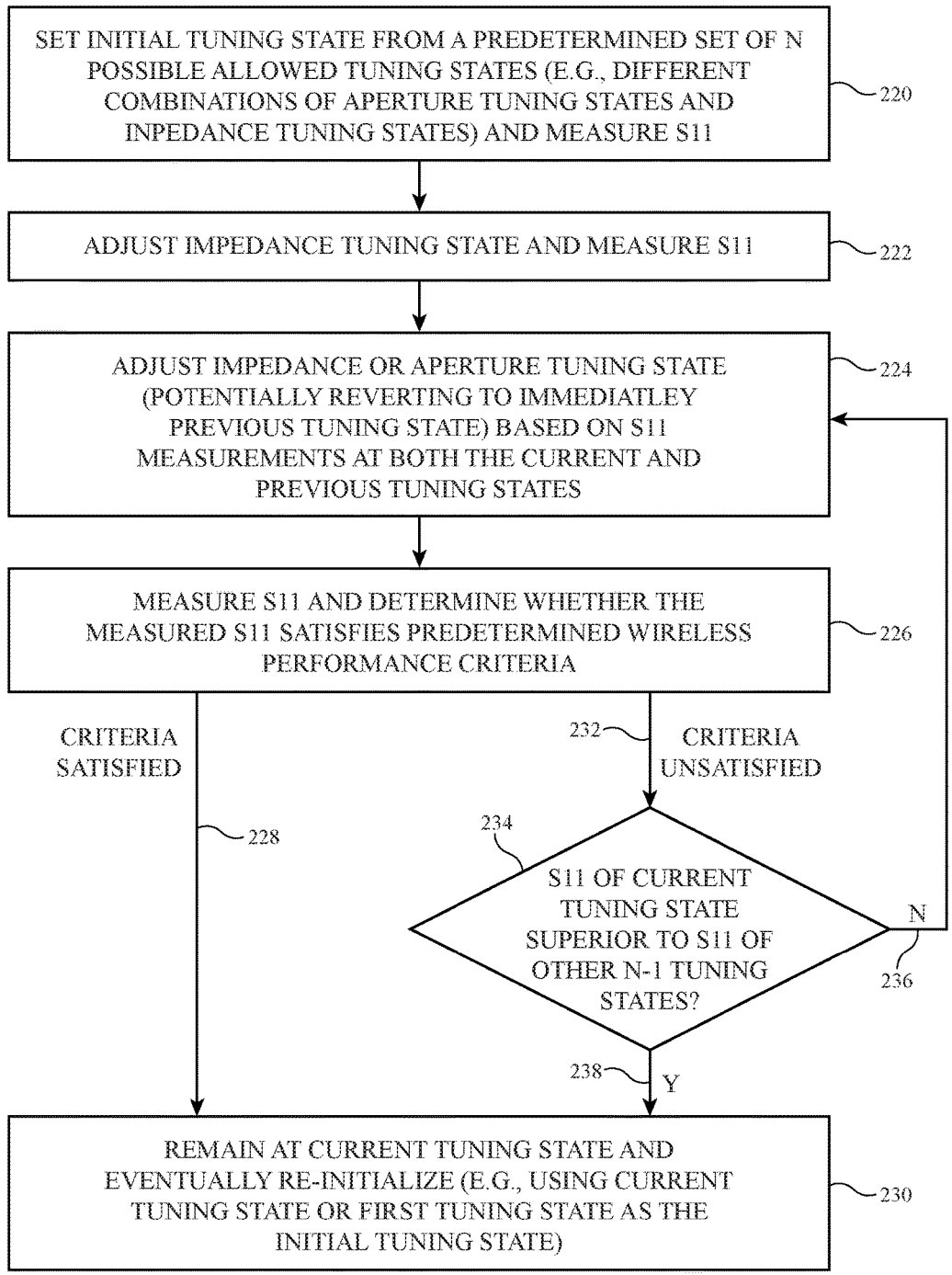
FIG. 10 is a flow chart of illustrative steps of illustrative steps that may be involved in performing low band antenna tuning using an antenna of the type shown in FIG. 6 in accordance with an embodiment.

FIG. 10 is a flow chart of illustrative steps involved in operating device 10 to ensure satisfactory performance for antenna 40 in low band LB. The steps of FIG. 10 may, for example, be performed by control circuitry 28.

Control circuitry 28 may collectively place aperture tuning circuits 120, 122, and 124 into a particular configuration or state (sometimes referred to herein as an aperture tuning state). Each aperture tuning state may include corresponding settings for adjustable components 120, 122, and 124 (e.g., each aperture tuning state may correspond to a different combination of settings for components 120, 122, and 124). For example, in a first aperture tuning state, switch 150 may couple inductor L1 to terminal 126, switch 152 couples inductor L3 to terminal 130, and switch 154 forms an open circuit, in a second aperture tuning state switch 150 couples inductor L2 to terminal 126, switch 152 couples inductor L4 to terminal 130, and switch 154 couples inductor L8 to terminal 134, in a third aperture tuning state switch 150 forms an open circuit, switch 152 couples inductor L3 to terminal 130, and switch 154 forms an open circuit, etc. Every possible combination of settings for components 120, 122, and 124 may represent a corresponding aperture tuning state for antenna 40.

Similarly, control circuitry 28 may place impedance tuning circuitry 140 into a particular configuration or state (sometimes referred to herein as an impedance tuning state). Each impedance tuning state may include corresponding settings for matching circuitry 140 (e.g., each impedance tuning state may correspond to a different impedance exhibited by circuitry 140). As an example, impedance matching circuitry 140 may have a first impedance tuning state at which circuitry 140 exhibits a first impedance and may have a second impedance tuning state at which circuitry 140 exhibits a second impedance that is different from the first impedance. In general, impedance matching circuitry 140 may have any desired number of impedance tuning states.

Control circuitry 28 may place antenna 40 into a particular configuration or state (sometimes referred to herein as a tuning state or antenna tuning state). Each tuning state may include a corresponding impedance tuning state for circuitry 140 and a corresponding aperture tuning state for the aperture tuning circuitry (e.g., each tuning state of antenna 40 may correspond to a different respective combination of impedance tuning state and aperture tuning state). Changing either the impedance tuning state or the aperture tuning state changes the tuning state of antenna 40, for example. The number of tuning states of antenna 40 may be equal to the product of the number of impedance tuning states and the number of aperture tuning states. For example, when antenna 40 has two aperture tuning states and two impedance tuning states, antenna 40 may have a total of four tuning states, when antenna 40 has three aperture tuning states and three impedance tuning states, antenna 40 may have a total of nine tuning states, when antenna 40 has two aperture tuning states and three impedance tuning states, antenna 40 may have a total of six tuning states, etc.

At step 220 of FIG. 10, control circuitry 28 may place (set) antenna 40 in an initial tuning state. The initial tuning state may be selected from a predetermined set of N allowed tuning states. The N allowed tuning states may, for example, be determined based on calibration of device 10 (e.g., during device manufacture or calibration). The N allowed tuning states may be less than the total number of possible tuning states of antenna 40. For example, in the arrangement of FIG. 6, there may be four tuning states of antenna 40 (e.g., corresponding to four different combinations of two aperture tuning states and two impedance tuning states) even though there are more than four total combinations of settings for components 120, 122, 124, and 140. The N allowed tuning states may be, for example, tuning states that have an effect on the tuning or efficiency of antenna 40 at the frequency band of interest (e.g., as determined during calibration of device 10). The initial tuning state may include an initial impedance tuning state for circuitry 140 and an initial aperture tuning state for circuits 120, 122, and 124.

Control circuitry 28 may gather impedance measurements (e.g., S11 values) using coupler 142 while antenna 40 is placed in the initial tuning state. Control circuitry 28 may store the measured S11 values on storage circuitry (e.g., memory) for subsequent processing.

In some scenarios, control circuitry 28 sweeps through each of the N allowed tuning states of antenna 40 before selecting the tuning state to use for communications. In this scenario, control circuitry 28 may gather S11 values at each of the N tuning states in the sweep and then after stepping through each tuning state, may process the S11 values to select the tuning state to use for subsequent communications (i.e., the tuning state for which antenna 40 has maximum efficiency given the current antenna loading conditions). However, sweeping through each of the N tuning states requires antenna 40 to spend a significant amount of time at tuning states that may be associated with relatively low antenna efficiency given the current antenna loading conditions. This may lead to a relatively high likelihood of the communications link between antenna 40 and external communications equipment (e.g., a telephone call handled by antenna 40) being dropped.

In order to mitigate these risks, control circuitry 28 may adjust the tuning state of antenna 40 by first adjusting the impedance tuning state of circuitry 140 (step 222). Control circuitry 28 may subsequently gather S11 values or other impedance data using coupler 142.

At step 224, control circuitry 28 may adjust the tuning state of antenna 40 by adjusting one of the impedance tuning state or the aperture tuning state. Control circuitry 28 may, if desired, adjust the tuning state back to the immediately previous tuning state (e.g., back to the initial tuning state during the first iteration of the steps of FIG. 10 by reversing the impedance tuning state adjustment performed at step 222). Control circuitry 28 may select the tuning state to adjust to (of the N allowed tuning states) based on the S11 values gathered during the current (active) tuning state and the immediately previous tuning state (e.g., using S11 values gathered while processing step 222 and 220 in the first iteration of the steps of FIG. 10).

For example, control circuitry 28 may select the tuning state to tune to based on a comparison of the S11 values during the current tuning state to the S11 values gathered during the immediately previous tuning state. The comparison may be performed between individual S11 values gathered in each tuning state or between a combination of S11 values gathered in each tuning state (e.g., an average or linear combination of multiple S11 values in each tuning state). In one suitable arrangement, control circuitry 28 may revert to the immediately previous tuning state in response to determining that the magnitude of S11 values gathered in the current tuning state is greater than the magnitude of S11 values gathered during the immediately previous tuning state. In this example, control circuitry 28 may adjust the tuning state by changing one (but not both) of the aperture tuning state and the impedance tuning state in response to determining that the magnitude of S11 values gathered in the current tuning state is less than or equal to the magnitude of S11 values gathered during the immediately previous tuning state. By adjusting only one of the aperture tuning state or the impedance tuning state at a time when adjusting the antenna tuning state (and potentially reverting to the previous tuning state), control circuitry 28 may reduce the risk of dropping the communications link with external equipment relative to scenarios where both the impedance tuning state and the aperture tuning state are adjusted at the same time.

At step 226, once control circuitry 28 has adjusted the tuning state (e.g., by adjusting the aperture tuning state or the impedance tuning state, potentially reverting to the previous antenna tuning state), control circuitry may gather additional S11 values. Control circuitry 28 may determine whether the additional S11 values gathered at the current tuning state satisfy predetermined wireless performance criteria.

The predetermined wireless performance criteria may, for example, include a predetermined range of acceptable S11 values. The predetermined range of acceptable S11 values may be defined by a maximum S11 magnitude threshold value. In this example, control circuitry 28 may determine whether the additional S11 values satisfy the predetermined wireless performance criteria by determining whether the additional S11 measurements fall within the predetermined range of acceptable S11 values (e.g., by determining whether the magnitude of the additional S11 values is less than the maximum S11 magnitude threshold value). If the additional S11 values fall within the predetermined range (e.g., if the S11 values or an average or other combination of the S11 values has a magnitude that falls below the maximum S11 magnitude threshold value), control circuitry 28 may determine that the wireless performance criteria have been satisfied. Otherwise, control circuitry 28 may determine that the wireless performance criteria have not been satisfied. This example is merely illustrative and, in general, any desired wireless performance criteria may be used.

If control circuitry 28 determines that the wireless performance criteria have been satisfied, processing may proceed to step 230 as shown by path 228. At step 230, control circuitry 28 may control antenna 40 to remain at the current tuning state. Control circuitry 28 may continue to gather S11 information if desired. Antenna 40 may transmit and/or receive signals at the current tuning state until the magnitude of the measured S11 values fall below the maximum S11 magnitude threshold value (e.g., until the loading conditions of antenna 40 change). In another suitable arrangement, antenna 40 may remain at the current tuning state for a predetermined amount of time. In general, any antenna 40 may remain at the current tuning state until any other desired trigger condition occurs. Once the trigger condition occurs (e.g., once the loading conditions of antenna 40 have changed, a predetermined amount of time has passed, device 10 changes operating modes, etc.), the steps of FIG. 10 may be re-initialized using the current tuning state, the first tuning state (e.g., the initial tuning state from the first iteration of the steps of FIG. 10), or any other desired tuning state as the initial tuning state set at step 220.

If control circuitry 28 determines that the wireless performance criteria have not been satisfied while processing step 226, processing may proceed to step 234 as shown by path 232. At step 234, control circuitry 28 may determine whether the S11 values gathered at the current tuning state (i.e., the tuning state that was selected during the current iteration of step 224) are superior to the S11 values gathered at the other N−1 allowable tuning states. For example, circuitry 28 may compare the magnitude of the S11 values gathered at the current tuning state to the magnitude of S11 values gathered at the other N−1 allowable tuning states. If the magnitude of the S11 values at the current tuning state is less than the magnitude of the S11 values gathered at the other N−1 allowable tuning states, control circuitry 28 may determine that the S11 values gathered at the current tuning state are superior to the S11 values gathered at the other N−1 allowable tuning states. Otherwise, control circuitry 28 may determine that the S11 values gathered at the current tuning state are not superior to the S11 values gathered at the other N−1 allowable tuning states.

If control circuitry 28 determines that the S11 values gathered at the current tuning state are superior to the S11 values gathered at the other N−1 allowable tuning states, processing may proceed to step 230 as shown by path 238. If control circuitry 28 determines that the S11 values gathered at the current tuning state are superior to the S11 values gathered at the other N−1 allowable tuning states, processing may loop back to path 224 as shown by path 236. Control circuitry 28 may subsequently perform additional iterations of aperture tuning state or impedance tuning state adjustments (potentially reverting back to any immediately previous tuning state) until the wireless performance criteria is satisfied. Step 234 may be omitted in the first iteration of FIG. 10 or may be omitted from every iteration of FIG. 10 if desired (e.g., path 232 may loop back directly to step 224 over path 236 if desired). The Control circuitry 28 may select whether the aperture tuning state or the impedance tuning state is adjusted in processing step 224 based on any desired criteria such as the S11 measurements gathered in one or more previous tuning states. If desired, control circuitry 28 may select whether to adjust the aperture tuning state or the impedance tuning state when switching to the next antenna tuning state based on whether the impedance tuning state or aperture tuning state was adjusted to reach the current antenna tuning state. For example, control circuitry 28 may adjust the impedance tuning state if the previous antenna tuning state adjustment was performed by adjusting the aperture tuning state (e.g., if the aperture tuning state was adjusted during the previous iteration of FIG. 10). Control circuitry 28 may adjust the aperture tuning state if the previous antenna tuning state adjustment was performed by adjusting the impedance tuning state (e.g., if the impedance tuning state was adjusted during the previous iteration of FIG. 10). This may apply only to scenarios where control circuitry 28 does not revert to the immediately previous tuning state while processing step 224, for example. The example of FIG. 10 in which S11 measurements are used to adjust the tuning state is merely illustrative. In general, any desired impedance measurements or other wireless performance metric data may be used.

By processing the S11 data to determine whether to adjust the antenna tuning state, alternating between aperture tuning state adjustments and impedance tuning state adjustments, and potentially reverting back to an immediately previous tuning state at each iteration of step 226 of FIG. 10, control circuitry 28 may reduce the risk of dropping the wireless link (e.g., dropping a telephone call with external equipment) relative to scenarios in which control circuitry 28 blindly sweeps through each of the N tuning states before identifying a tuning state at which to remain. In practice, adjusting the impedance tuning state may involve less risk of dropping the communications link than adjusting the aperture tuning state. Performing the first antenna tuning state adjustment by adjusting the impedance tuning state (e.g., while processing step 222) may involve less overall risk of dropping the wireless link than if the aperture tuning state were adjusted first. Processing the steps of FIG. 10 may allow control circuitry 28 to actively place antenna 40 in an optimal tuning state for communications in a selected frequency within low band LB given the current antenna loading conditions, even if the antenna loading conditions change over time. For example, even if a user's grip deteriorates the antenna efficiency of antenna 40 in low band LB (e.g., as shown by curve 184 of FIG. 7), performing the steps of FIG. 10 may allow antenna 40 to exhibit satisfactory antenna efficiency (e.g., as shown by curves 172, 172, and 174 of FIG. 7) regardless the user's grip on device 10.

Figure 11:
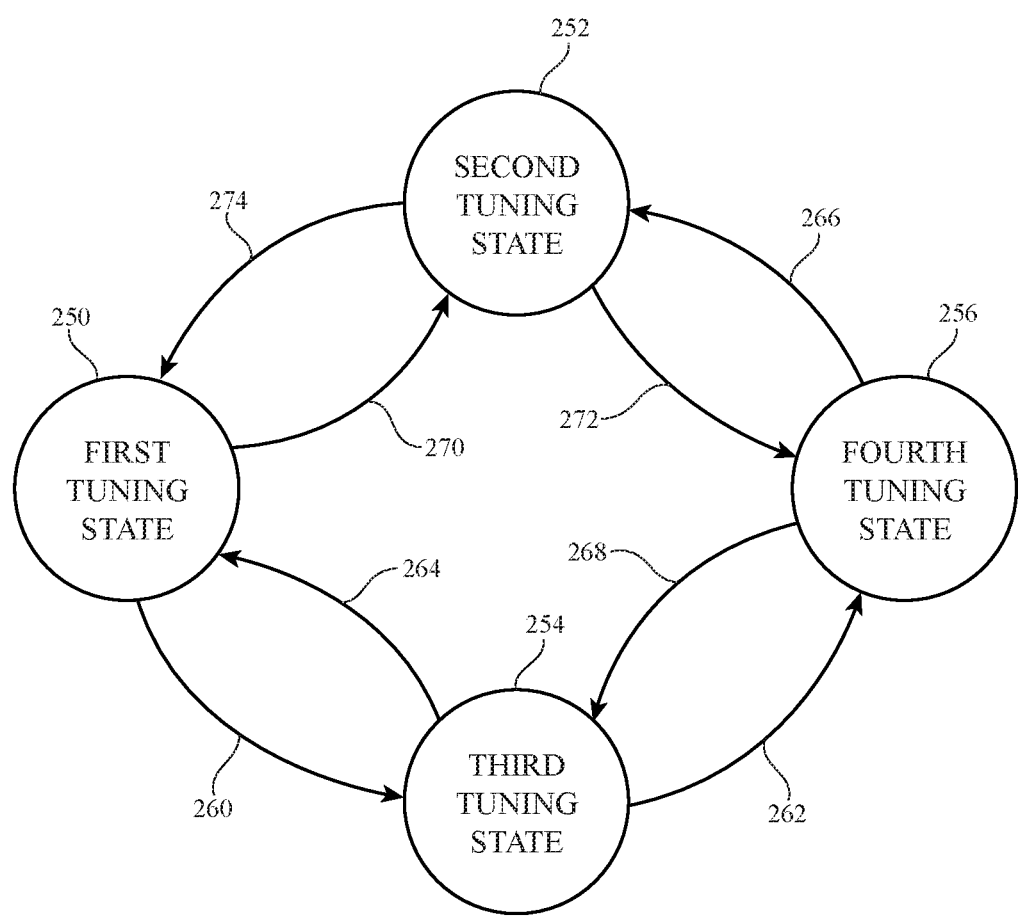
FIG. 11 is a state diagram showing illustrative low band antenna operating modes for an electronic device in accordance with an embodiment.

A state diagram showing illustrative operating modes for device 10 in performing wireless communications in low band LB using antenna 40 is shown in FIG. 11. In the example of FIG. 11, control circuitry 28 places antenna 40 in one of four different allowable tuning states (e.g., there may be N=4 allowable tuning states). This is merely illustrative and, in general, there may be any desired number of antenna tuning states.

In the example of FIG. 11, control circuitry 28 may adjust antenna 40 between a first tuning state 250, a second tuning state 252, a third tuning state 254, and a fourth tuning state 256. In first tuning state 250, control circuitry 28 may place impedance circuitry 140 in a first impedance tuning state and may place the aperture tuning circuitry in a first aperture tuning state. In second tuning state 252, control circuitry 28 may place impedance circuitry 140 in the first impedance tuning state and may place the aperture tuning circuitry in a second aperture tuning state. In third tuning state 254, control circuitry 28 may place impedance circuitry 140 in a second impedance tuning state and may place the aperture tuning circuitry in the first aperture tuning state. In fourth tuning state 256, control circuitry 28 may place impedance circuitry 28 in the second impedance tuning state and may place the aperture tuning circuitry in the second aperture tuning state.

In some scenarios, control circuitry 28 blindly sweeps through each of tuning states 250, 252, 254, and 256 and then processes S11 values gathered at each tuning state before identifying a tuning state in which to remain. In order to mitigate the risks associated with blindly sweeping through each tuning state in this manner, the processing operations of FIG. 10 may be performed to adjust antenna 40 between the tuning states.

For example, control circuitry 28 may place antenna 40 in an initial tuning state such as first tuning state 250 (e.g., while processing step 220 of FIG. 10). Control circuitry 28 may gather S11 values while antenna 40 is tuned to first tuning state 250. Control circuitry 28 may subsequently adjust the impedance tuning state to the second impedance tuning state, which places antenna 40 into third tuning state 254 as shown by arrow 260 (e.g., while processing a first iteration of step 224 of FIG. 10). Control circuitry 28 may gather S11 values while antenna 40 is tuned to third tuning state 250. Control circuitry 28 may determine whether the S11 values gathered at tuning state 250 satisfy predetermined wireless performance criteria (e.g., while processing step 226 of FIG. 10).

In response to determining that the S11 values satisfy the predetermined wireless performance criteria, control circuitry 28 may control antenna 40 to remain at state 254 (e.g., while processing step 230 of FIG. 10). In response to determining that the S11 values fail to satisfy the predetermined wireless performance criteria, control circuitry 28 may adjust either the aperture tuning state to advance to state 256 as shown by arrow 262 (e.g., in scenarios where the magnitude of the S11 values gathered at state 254 are less than the magnitude of the S11 values gathered at state 250), or may adjust the impedance tuning state to revert to the immediately previous state (i.e., first state 250) as shown by path 264 (e.g., in scenarios where the magnitude of the S11 values gathered at state 254 are greater than or equal to those initially measured at state 250).

In scenarios where control circuitry 28 adjusts antenna 40 from tuning state 254 to tuning state 256, control circuitry 28 may gather additional S11 values while antenna 40 is at fourth tuning state 256 and may compare those S11 values to the S11 values gathered at tuning state 254 to determine whether to remain at state 256, advance to second tuning state 252 as shown by path 266, or to revert to third tuning state 254 as shown by path 268 (e.g., while processing a second iteration of steps 224 and 226 of FIG. 10). In scenarios where control circuitry 28 adjusts antenna 40 from tuning state 254 back to tuning state 250, control circuitry 28 may gather additional S11 values at tuning state 250 and may compare those S11 values to the S11 values gathered at tuning state 254 to determine whether to remain at state 256, advance to second tuning state 252 as shown by path 270, or revert to third tuning state 254 as shown by path 260 (e.g., while processing a second iteration of steps 224 and 226 of FIG. 10). Similar operations may be performed to remain at second tuning state 252, to advance from tuning state 252 to fourth tuning state 256 as shown by arrow 272, or to advance from tuning state 252 to first tuning state 250 as shown by arrow 274. In this way, control circuitry 28 may alternate between adjustments to the aperture tuning state and the impedance tuning state, potentially reverting to a previous tuning state, until satisfactory S11 measurements are obtained (e.g., until satisfactory antenna efficiency given the current low band frequency and antenna loading conditions is obtained).

If desired, the steps of FIG. 10 may be restarted (reset) at any desired time (e.g., control circuitry 40 may revert antenna 40 back to an initial state such as first tuning 250 regardless of the current tuning state of antenna 40). In one suitable arrangement, control circuitry 28 may determine whether to reset the operations of FIG. 10 by perform offset comparison operations.

Figure 12:
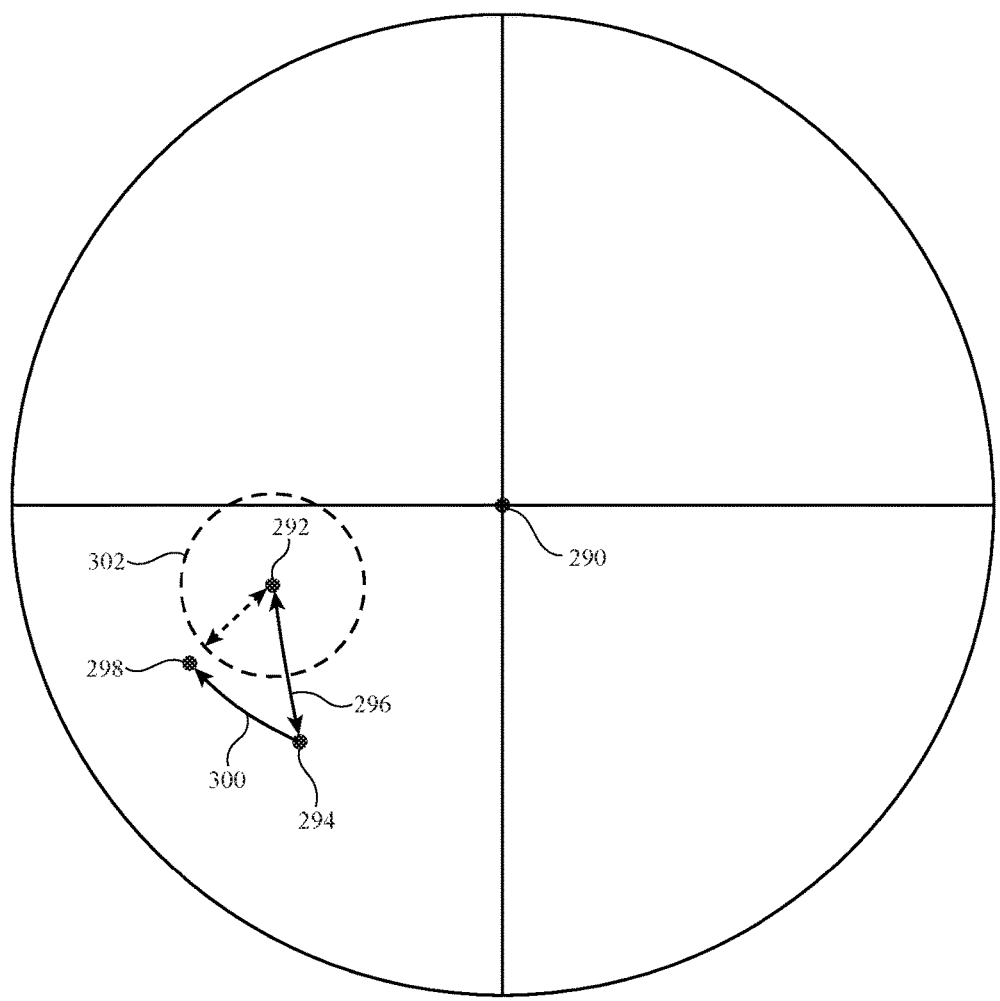
FIG. 12 is a Smith chart showing illustrative impedances that may be used in performing offset comparison operations for low band antenna tuning in accordance with an embodiment.

FIG. 12 is a Smith chart showing how offset comparison operations may be performed to reset low band tuning operations. In the Smith chart of FIG. 12, antenna impedances for antenna 40 are measured as a function of different operating conditions. A fifty ohm antenna impedance is characterized by impedance point 290 in FIG. 12.

Under a given loading condition, antenna 40 may exhibit an impedance at point 292 while tuned to a given tuning state such as third tuning state 254 of FIG. 11. When antenna 40 is adjusted to a different tuning state such as fourth tuning state 256 (e.g., while processing step 224 of FIG. 10), the impedance exhibited by antenna 40 may shift to point 294 as shown by arrow 296. In this example, control circuitry 28 may control antenna 40 to revert to the immediately previous tuning state (i.e., third tuning state 254). Reverting back to third tuning state 254 may cause antenna 40 to exhibit an impedance at point 298 as shown by arrow 300. If the antenna loading conditions have not changed between measuring impedance 292 and 298, impedance 298 will overlap with or lie in close proximity to point 292. However, if the antenna loading conditions have changed, impedance 298 will be located relatively far away from impedance 292 on the Smith chart of FIG. 12.

In the example of FIG. 12, the antenna loading conditions have changed and impedance 298 is offset with respect to impedance 292. Control circuitry 298 may identify the magnitude of the offset between points 298 and 292 and may compare the magnitude of the offset to an offset threshold, such as threshold 302. If control circuitry 28 determines that the offset between points 298 and 292 exceeds the threshold, control circuitry 28 may reset the tuning state of antenna 40 (e.g., may place antenna 40 in the initial tuning state) and may restart the operations of FIG. 10. In the example of FIG. 12, because point 298 lies farther than threshold 302 away from point 292, control circuitry 28 may reset the tuning state of antenna 40 to the initial tuning state and may restart the operations of FIG. 10. Such offset comparison operations may be performed while processing step 224 whenever reverting back to an immediately previous tuning state, for example. In this way, control circuitry 28 may ensure that antenna 40 is retuned to account for any changes in the loading conditions of antenna 40 in real time, for example. While the examples of FIGS. 10-12 are described in connection with communications in low band LB, the operations of FIGS. 10-12 may be performed for communications in any desired frequency bands.

Control circuitry 28 may be configured to perform these operations (e.g., the operations of FIGS. 8-12) using hardware (e.g., dedicated hardware or circuitry) and/or software (e.g., code that runs on the hardware of device 10). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 28. The processing circuitry may include application-specific integrated circuits with processing circuitry, one or more microprocessors, or other processing circuitry.

The foregoing is merely illustrative and various modifications can be made by those skilled in the art without departing from the scope and spirit of the described embodiments. The foregoing embodiments may be implemented individually or in any combination.

What is claimed is:

1. An electronic device configured to be operated in a first orientation while held in a right hand of a user and in a second orientation while held in a left hand of the user, the electronic device comprising:

orientation sensor circuitry configured to generate orientation data that identifies when the electronic device is in a given one of the first and second orientations;

an antenna having a resonating element arm, an antenna ground, an antenna feed having a first feed terminal coupled to the resonating element arm and a second feed terminal coupled to the antenna ground, and first and second tunable components coupled to the resonating element arm on opposing sides of the first feed terminal, wherein the antenna resonating element arm and the antenna ground are configured to exhibit a first resonance in a first communications band and a second resonance in a second communications band that is higher in frequency than the first communications band; and control circuitry, wherein the control circuitry is configured to, based on the orientation data, place the antenna in a first non-free space mode of antenna operation in which the first tunable component tunes the second resonance and in a second non-free space mode of antenna operation in which the second tunable component tunes the second resonance, the antenna feed being configured to convey radio-frequency signals for the antenna in both the first and second non-free space modes of antenna operation.

2. The electronic device defined in claim 1, wherein the first tunable component comprises first and second switchable inductors coupled between the resonating element arm and the antenna ground.

3. The electronic device defined in claim 2, wherein the second tunable component comprises third and fourth switchable inductors coupled between the resonating element arm and the antenna ground.

4. The electronic device defined in claim 3, wherein the antenna further comprises a fourth tunable component coupled between the resonating element arm and the antenna ground, the fourth tunable component is coupled to the resonating element arm at a location between the first tunable component and the first feed terminal, and the control circuitry is configured to adjust the fourth tunable component to tune a selected one of the first resonance and the second resonance.

5. The electronic device defined in claim 4, wherein the fourth tunable component comprises:

four additional switchable inductors coupled between the resonating element arm and the antenna ground.

6. The electronic device defined in claim 3, wherein the control circuitry is configured to place the antenna in the first non-free space mode of antenna operation in response to determining that the orientation sensor data identifies that the electronic device is in the first orientation and the control circuitry is configured to place the antenna in the second non-free space mode of antenna operation in response to determining that the orientation sensor data identifies that the electronic device is in the second orientation.

7. The electronic device defined in claim 6, wherein the control circuitry is configured to control the first tunable component to tune the second resonance in the first non-free space mode of antenna operation by selectively coupling a given one of the first and second switchable inductors between the resonating element arm and the antenna ground.

8. The electronic device defined in claim 7, wherein the control circuitry is configured to control the second tunable component to tune the second resonance in the second non-free space mode of antenna operation by selectively coupling a given one of the third and fourth switchable inductors between the resonating element arm and the antenna ground.

9. The electronic device defined in claim 8, further comprising:

a metal electronic device housing, wherein the resonating element arm is separated from the antenna ground by a slot in the metal electronic device housing and the resonating element arm and the antenna ground are formed from portions of the metal electronic device housing.

10. The electronic device antenna defined in claim 1 further comprising:

radio-frequency transceiver circuitry; and a coupler interposed between the radio-frequency transceiver circuitry and the antenna feed, wherein the control circuitry is configured to gather antenna impedance information associated with the antenna using signals received by the transceiver circuitry over the coupler, and wherein the control circuitry is configured to place the antenna in a selected one of the first and second non-free space modes of antenna operation based on the orientation data and the gathered antenna impedance information.

11. Apparatus, comprising:

radio-frequency transceiver circuitry;

an antenna operable in a plurality of different tuning states and having an antenna resonating element, an antenna ground, an antenna feed, a tunable component coupled to the antenna resonating element, and an adjustable impedance matching circuit coupled between the antenna feed and the antenna resonating element;

control circuitry coupled to the antenna; and sensor circuitry coupled to the control circuitry, wherein the control circuitry is configured to:

place the antenna in a first tuning state of the plurality of tuning states by adjusting the adjustable impedance matching circuit;

adjust the antenna from the first tuning state to a second tuning state of the plurality of tuning states by adjusting the tunable component; and gather sensor data using the sensor circuitry while the antenna is placed in each of the first and second tuning states.

12. The apparatus defined in claim 11, wherein the control circuitry is further configured to, based on the sensor data, adjust the antenna from the second tuning state back to the first tuning state by adjusting the tunable component prior to adjusting the antenna to any other tuning state of the plurality of tuning states.

13. The apparatus defined in claim 11, wherein the control circuitry is further configured to, based on the sensor data, adjust the antenna from the second tuning state to a third tuning state of the plurality of tuning states by adjusting the adjustable impedance matching circuit.

14. The apparatus defined in claim 13, wherein the tunable component comprises a plurality of inductors and switching circuitry and the control circuitry is configured to adjust the tunable component by controlling the switching circuitry to couple a selected one of the plurality of inductors between the antenna resonating element and the antenna ground.

15. The apparatus defined in claim 14, wherein the control circuitry is configured to adjust the adjustable impedance matching circuit by controlling the adjustable impedance matching circuit to exhibit a selected one of a first impedance and a second impedance that is different from the first impedance.

16. The apparatus defined in claim 15, wherein a first inductor of the plurality of inductors is coupled between the antenna resonating element and the antenna ground and the impedance matching circuit exhibits the first impedance when the antenna is placed in the first tuning state, a second inductor of the plurality of inductors is coupled between the antenna resonating element and the antenna ground and the impedance matching circuit exhibits the first impedance when the antenna is placed in the second antenna tuning state, and the second inductor is coupled between the antenna resonating element and the antenna ground and the impedance matching circuit exhibits the second impedance when the antenna is placed in the third antenna tuning state.

17. The apparatus defined in claim 11, wherein the sensor circuitry comprises an impedance sensor and the sensor data comprises S11 scattering parameter values gathered while the antenna is placed in the first and second tuning states.

18. An electronic device, comprising:
radio-frequency transceiver circuitry;
an antenna operable in a set of different tuning states and having an antenna resonating element, an antenna ground, an antenna feed, a tunable component coupled to the antenna resonating element, and an adjustable impedance matching circuit coupled between the antenna feed and the antenna resonating element;
sensor circuitry configured to generate sensor data; and
control circuitry, wherein the control circuitry is configured place the antenna in each of the tuning states in the set of tuning states by:
tuning the antenna from a first tuning state in the set of tuning states to a second tuning state in the set of tuning states by adjusting a selected one of the adjustable impedance matching circuit and the tunable component; and
based on the sensor data, adjusting the antenna to return to the first tuning state from the second tuning state prior to tuning the antenna to a third tuning state in the set of tuning states.

19. The electronic device defined in claim 18, wherein the sensor circuitry comprises an impedance sensor, the sensor data comprises S11 scattering parameter values, and the control circuitry is further configured to:
gather a first S11 scattering parameter value using the impedance sensor while the antenna is tuned to the first tuning state and a second S11 scattering parameter value using the impedance sensor while the antenna is tuned to the second tuning state;
compare a magnitude of the first S11 scattering parameter value to a magnitude of the second S11 scattering parameter value; and
in response to determining that the magnitude of the second S11 scattering parameter value is greater than the magnitude of the first S11 scattering parameter value, adjust the antenna to return to the first tuning state from the second tuning state prior to tuning the antenna to the third tuning state.

20. The electronic device defined in claim 19, wherein the control circuitry is further configured to:
gather a third S11 scattering parameter value using the impedance sensor while the antenna is tuned to the first tuning state after returning to the first tuning state from the second tuning state;
compare an offset between the third S11 scattering parameter value and the first S11 scattering parameter value to a threshold value; and
in response to determining that the offset exceeds the threshold value, reset the antenna to an initial tuning state in the set of tuning states.

* * * * *